(12) United States Patent
Mori

(10) Patent No.: US 10,269,389 B2
(45) Date of Patent: Apr. 23, 2019

(54) VIDEO PROCESSING APPARATUS, VIDEO PROCESSING METHOD, AND PROGRAM

(71) Applicant: CANON KABUSHIKI KAISHA, Tokyo (JP)

(72) Inventor: Shigeki Mori, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 15/204,684

(22) Filed: Jul. 7, 2016

(65) Prior Publication Data
US 2017/0018288 A1   Jan. 19, 2017

(30) Foreign Application Priority Data

Jul. 13, 2015 (JP) .................................. 2015-140045

(51) Int. Cl.
*G11B 27/031* (2006.01)
*H04N 5/232* (2006.01)

(52) U.S. Cl.
CPC ....... *G11B 27/031* (2013.01); *H04N 5/23212* (2013.01); *H04N 5/23216* (2013.01); *H04N 5/23293* (2013.01)

(58) Field of Classification Search
USPC ................................................. 386/278–290
See application file for complete search history.

(56) References Cited

U.S. PATENT DOCUMENTS

| 5,432,577 A * | 7/1995 | Kobayshi | ................ G03B 7/16 396/155 |
| 2010/0141826 A1* | 6/2010 | Thorn | .................... G03B 13/32 348/345 |

FOREIGN PATENT DOCUMENTS

| JP | H08334674 A | 12/1996 |
| JP | H10200807 A | 7/1998 |
| JP | 2001145094 A | 5/2001 |
| JP | 2004253904 A | 9/2004 |

\* cited by examiner

*Primary Examiner* — Hung Q Dang
(74) *Attorney, Agent, or Firm* — Canon U.S.A., Inc. IP Division

(57) ABSTRACT

A video processing apparatus includes an input unit configured to input information instructing a focus position, in a first shooting, an acquisition unit configured, in a case in which the information instructing a focus position has been input by the input unit, to acquire position information indicating the instructed focus position, and time information indicating a time at which the focus position has been instructed, and a control unit configured to control a focus position in a second shooting based on the position information and the time information that have been acquired by the acquisition unit.

10 Claims, 15 Drawing Sheets

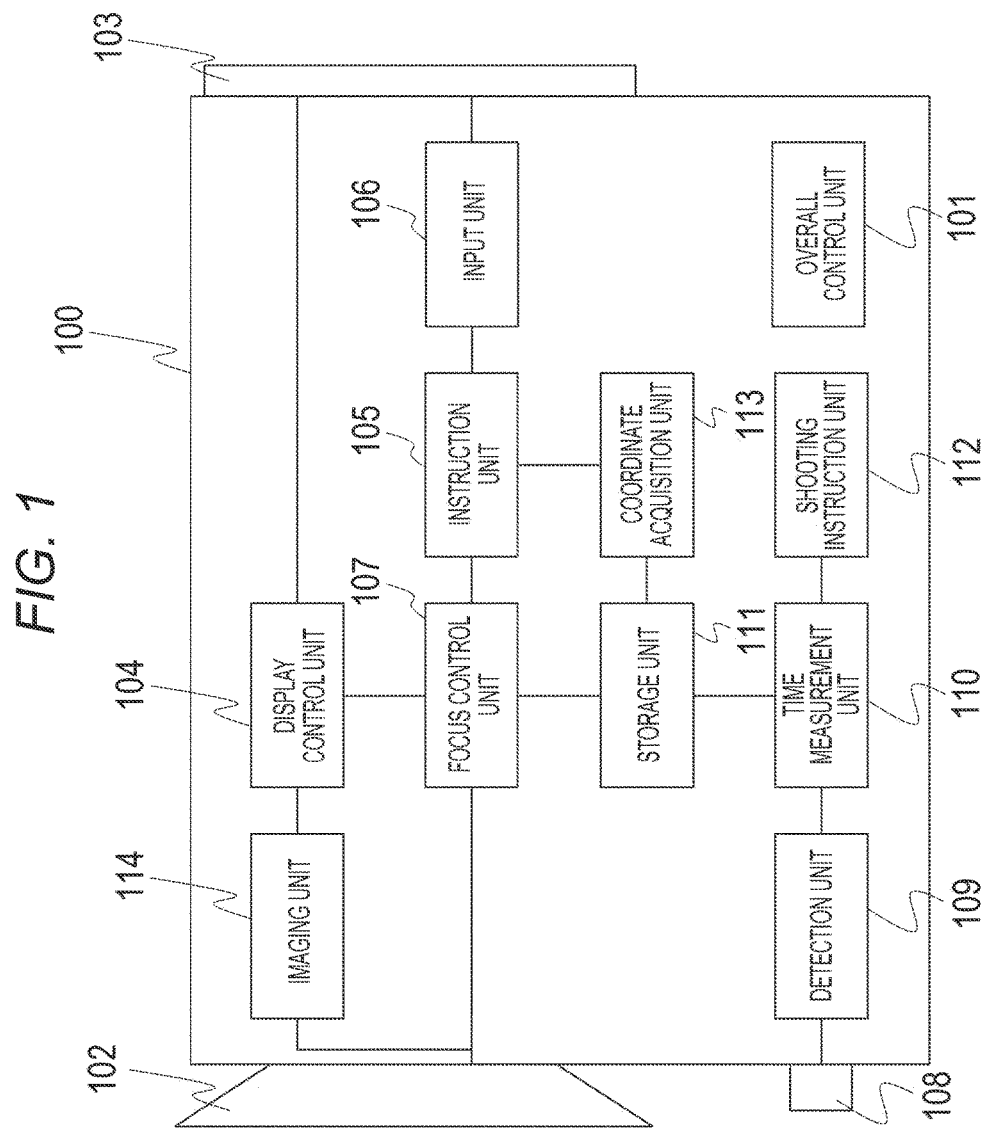

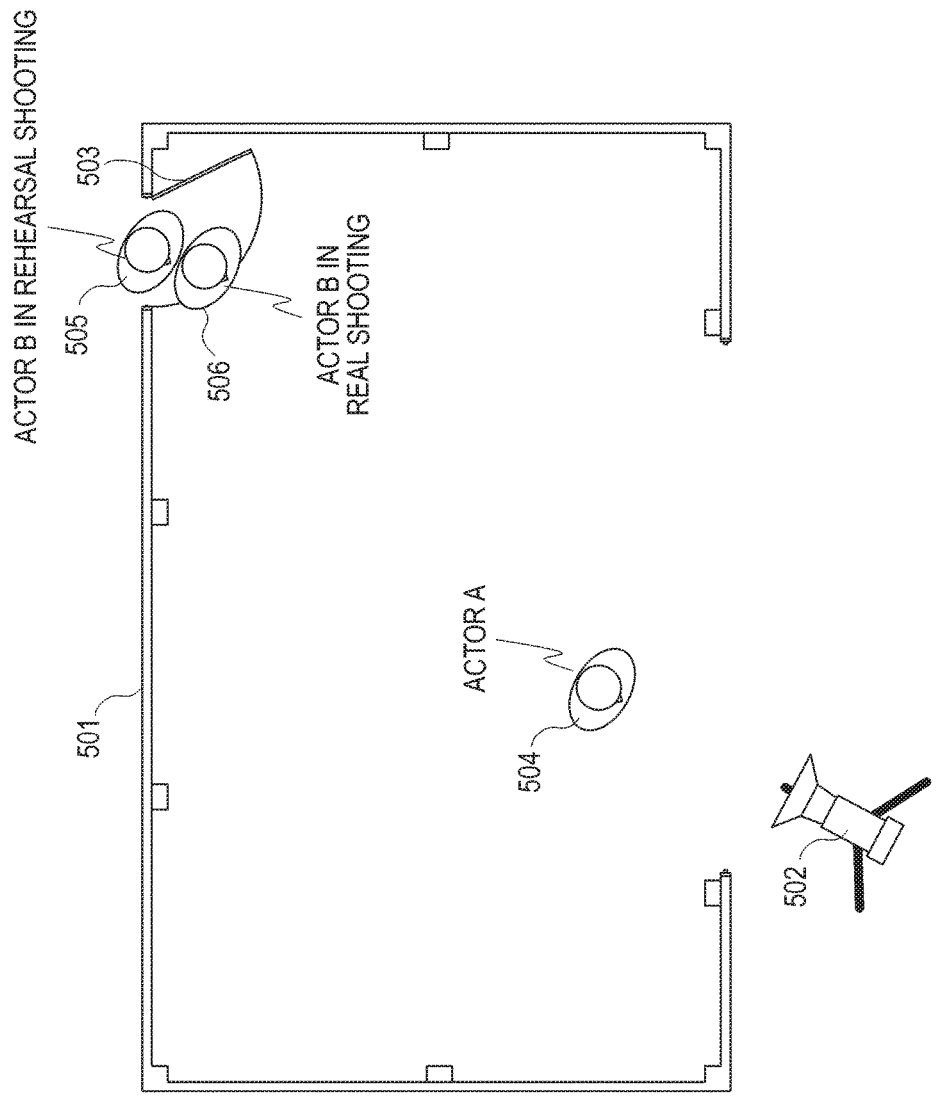

VIDEO PROCESSING APPARATUS, VIDEO PROCESSING METHOD, AND PROGRAM

BACKGROUND OF THE INVENTION

Field of the Invention

The present invention relates to a video processing apparatus, a method, and a program for performing processing for putting a focus on a subject.

Description of the Related Art

In the production of content such as films, in some cases, videos of respective scenes constituting video content are each formed of a plurality of shot videos (short videos each serving as the minimum unit of shooting). In addition, when shooting of each shot video of a specific scene video is performed, shooting is repetitively performed in similar situations, obtained shot videos are compared, and a shot video to be finally used is selected. The specific scene video can be thereby generated.

In addition, there has been known the following method of putting a focus on a subject in such shooting. More specifically, a desired focus position is prestored as a preset position, and a focus is put on the stored preset position according to a predetermined preset reproduction instruction issued by an operator or the like (Japanese Patent Application Laid-Open No. 8-334674).

In the method described in the above-described Japanese Patent Application Laid-Open No. 8-334674, a focus cannot be put on a subject existing at a position different from the prestored preset position (focus position) at an appropriate timing. In other words, for putting a focus on a subject existing at a position different from the preset position, a user needs to perform focus adjustment by a manual operation after preset reproduction. Thus, works bothersome for the user have been required.

SUMMARY OF THE INVENTION

For controlling a focus position in a second shooting according to a focus position instructed in a first shooting and a timing at which the instruction has been received, for example, a video processing apparatus includes the following configurations.

More specifically, a video processing apparatus includes an input unit configured to input information instructing a focus position, in a first shooting, an acquisition unit configured, in a case in which the information instructing a focus position has been input by the input unit, to acquire position information indicating the instructed focus position, and time information indicating a time at which the focus position has been instructed, and a control unit configured to control a focus position in a second shooting based on the position information and the time information that have been acquired by the acquisition unit.

Further features of the present invention will become apparent from the following description of exemplary embodiments (with reference to the attached drawings).

BRIEF DESCRIPTION OF THE DRAWINGS

FIG. 1 is a block diagram illustrating a configuration example of a video processing apparatus according to a first exemplary embodiment.

FIG. 5 is a diagram illustrating an example of transition of a stand position of a subject in a studio set.

DESCRIPTION OF THE EMBODIMENTS

Figure 2A:
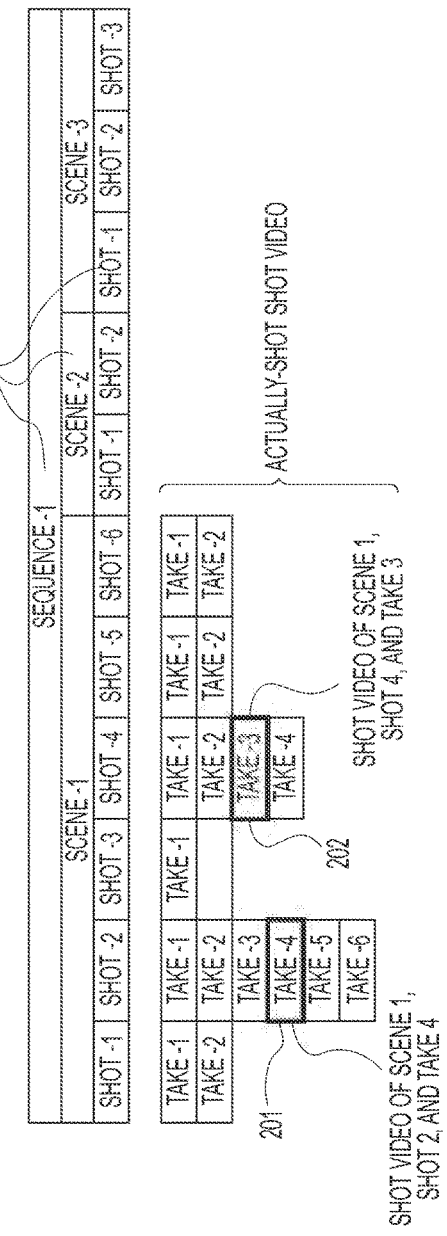
FIGS. 2A and 2B are diagrams illustrating a structure of video content.

An example of exemplary embodiments of the present invention will be described below in detail with reference to the appended drawings. In addition, the configurations described in the following exemplary embodiments are mere examples, and the present invention is not limited to the configurations illustrated in the drawings. In video data including 1 or more images, video data corresponding to 1 shot, which is the minimum unit of shooting, will be hereinafter referred to as a shot video, and video data including 1 or more shot videos will be hereinafter referred to as video content. In addition, the details of the shot video and the video content will be described, later using FIG. 2.

First Exemplary Embodiment

A configuration of a video processing apparatus according to the present exemplary embodiment will be described using FIG. 1. FIG. 1 is a diagram illustrating a configuration example of a video processing apparatus according to the present exemplary embodiment. The video processing apparatus according to the present exemplary embodiment is an imaging apparatus including an imaging unit. The video processing apparatus, however, is not limited to this. A video processing apparatus 100 according to the present exemplary embodiment captures an image of a subject to generate video data. A lens 102 constitutes an imaging optical system. An imaging unit 114 is an imaging unit for capturing an image of a subject, and includes a sensor for generating video data by converting light imaged through the lens 102, into electric charge. A display unit 103 displays an image (a video) captured by the imaging unit 114. A display control unit 104 controls the display unit 103 to display a video.

An input unit 106 receives an operation performed by an operator (a user), and acquires instruction information that is based on the received operation. For example, the input unit 106 detects a touch operation performed on the display unit 103 by the user, and acquires information instructing a focus position (position on a display screen on which a focus is to be put). In addition, in the present exemplary embodiment, the display unit 103 receives an operation performed by the user, and the input unit 106 acquires instruction information that is based on the operation performed on the display unit 103 by the user. The configuration, however, is not limited to this. In other words, the display unit 103 may have the function of the input unit 106.

An instruction unit 105 acquires, from the input unit 106, information instructing a focus position, and based on the information instructing a focus position, acquires information indicating a touched position (touch position) on a display screen of the display unit 103. The instruction unit 105 then outputs the acquired information to a processing unit on a subsequent stage. Here, the touch position refers to a position instructed by the user as a focus position (position on the display screen on which a focus is to be put).

Based on the information indicating the touch position that has been acquired from the instruction unit 105, a focus control unit 107 drives the lens 102 (performs focusing processing) so that a focus is put on a subject corresponding to the touch position. In addition, in the present exemplary embodiment, a method used by the focus control unit 107 is not limited to a method used for adjusting a focus, and the focus control unit 107 may use any method as long as the method can perform focusing processing with respect to a specific position (instructed position) on a shooting screen. For example, the focus control unit 107 can adjust a focus (perform automatic focusing processing) using a phase difference detection method, a contrast detection method, and the like. Alternatively, the focus control unit 107 may measure a distance from an imaging position to a subject corresponding to a touch position, and perform focusing processing based on the distance. Yet alternatively, the focus control unit 107 may perform focusing processing using a table indicating a relationship between a phase difference between a plurality of light beams input via the lens 102, and a driving amount of the lens 102.

A microphone 108 takes in audio as an electrical signal to generate audio information (an audio signal). The microphone 108 then outputs the generated audio information to a detection unit 109. Based on the audio information output from the microphone 108, the detection unit 109 detects, by voice recognition, an action call (predetermined identification information), which is an acting start command (instruction) issued by the user (shooting commander, director, etc.). In addition, the detection unit 109 acquires a timing at which the action call has been detected (time information). A time measurement unit 110 measures a time using the time point at which the action call has been detected by the detection unit 109, as a starting point. Based on the time measured by the time measurement unit 110, a storage unit 111 records (stores) information indicating an instructed focus position (touch position) and information indicating a time at which information instructing a focus position has been acquired (touch time).

When the shooting of a shot video similar to an already-shot shot video (another take of the same shot) is performed, a shooting instruction unit 112 outputs, to an overall control unit 101, retake information indicating that similar shooting is to be performed. A coordinate acquisition unit 113 acquires (reads, calls) position information (information indicating a touch position) stored in the storage unit 111.

The overall control unit 101 controls the units in the video processing apparatus 100, and transmits parameters between the units. In FIG. 1, lines indicating connections between the overall control unit 101 and the other units in the video processing apparatus 100 are omitted. In addition, the overall control unit 101 can control the units in the video processing apparatus 100 and read/write parameters between the units, through at least either a parameter signal line (not illustrated) or a register bus (not illustrated). In addition, in the present exemplary embodiment, the overall control unit 101 in FIG. 1 is installed within the video processing apparatus 100. The installation of the overall control unit 101, however, is not limited to this. In other words, the overall control unit 101 may be installed outside the video processing apparatus 100. In addition, the overall control unit 101 of the video processing apparatus 100 may control the units in the video processing apparatus 100 and read/write parameters between the units, through at least either a parameter signal line or a register bus that relays between the overall control unit 101 and the video processing apparatus 100.

Next, the details of video content and a shot video will be described using FIG. 2A. FIG. 2A is a diagram illustrating an example of a hierarchical concept of video data, which is video content including 1 or more shot videos, and is video data for creating video content such as cinema videos and drama videos. Video content that is based on a script or a scenario is formed of 1 or more sequences. One sequence video is formed of 1 or more scenes. Furthermore, 1 scene is formed of 1 or more shots. In addition, the video processing apparatus 100 according to the present exemplary embodiment uses 1 shot as a unit of 1 shooting.

For example, a scene in which 2 people (persons A and B) are talking with each other can be shot by various shooting methods. Shots different in shooting position and angle are shot. For example, such shots include a long shot obtained by shooting the talking 2 people in a wide angle, a closeup shot obtained by shooting the person B up close, a shoulder shot obtained by shooting the person A over the shoulder of the person B. Shots and scenes are not always shot in the order of a script or a scenario (reproduction order of video content), and in some cases, they are shot in an order different from the reproduction order of the video content for the convenience of an imaging apparatus or a shooting set. In addition, shooting of 1 shot may be retaken many times due to influences such as an error of an actor or a staff, the intention of a director, and unpredictable natural phenomenon. In this manner, shooting of the same shot will be referred to as a "take", and if the shooting of the same shot is performed a plurality of times, a number called "take" is allocated to each shot video for identifying each shooting.

More specifically, by adding, as shot data, shooting information such as the numbers of a sequence, a scene, a shot, and a take to each file of each shot video included in video content, each shot video can be specified (identified). For example, in FIG. 2A, a video 201 is represented by a sequence 1, a scene 1, a shot 2, and a take 4, and a video 202 is represented by a sequence 1, a scene 1, a shot 4, and a take 3. In addition, if there is a plurality of takes having the same shot number, these takes are used as replaceable takes in the creation of video content. Such information indicating a take is added to a shot video by shooting a board on which the take is written, or added by the user manually inputting the take. In addition, the terms such as "sequence", "scene", "shot", and "take" described here are mere examples for describing the present exemplary embodiment, and different terms may be used.

Figure 2B:
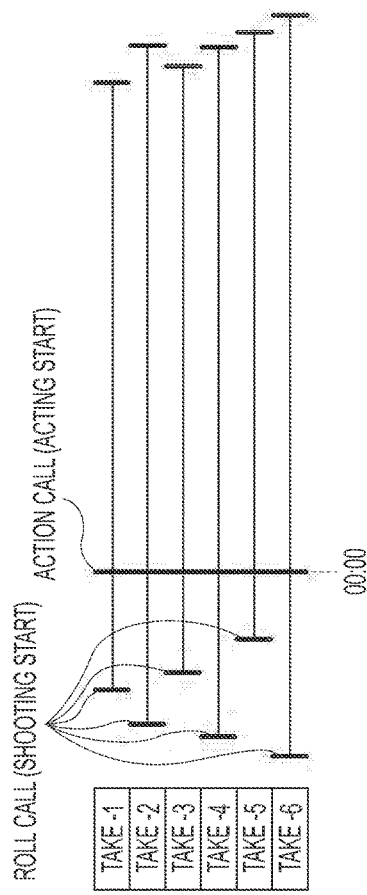

In addition, FIG. 2B is a diagram illustrating time axis coincidence (synchronization) of a plurality of takes of the same shot. Since each take of the same shot is a retake of the same shot, the time lengths of videos are substantially the same in many cases. In addition, the takes of the same shot can be replaced with one another when being edited as video content. Nevertheless, in actual shooting, times from the shooting start to the beginning of a video of a portion used for video content may vary among shot videos of the respective takes. In such a case, by using a timing of an action call (predetermined identification information), which is an acting start command (instruction) issued by a director, as time information indicating an acting start time, synchronization processing can be performed on the plurality of takes of the same shot. In other words, the video processing apparatus 100 according to the present exemplary embodiment matches (synchronizes) the timings of respective action calls in the plurality of takes of the same shot. In addition, the action call timing is not limited to the timing at which an acting start instruction is issued by the user, and may be timings at which various instructions are issued by the user. In addition, for the shooting of a shot video without action such as video only including scenery, the timing of a roll call indicating a shooting start may be used as an action call timing. In addition, the roll call timing may be a timing at which a shooting start instruction is issued by the user, or may be a timing at which the imaging unit 114 starts shooting processing. In addition, in the present exemplary embodiment, the time information is information indicating the time of the beginning of a video. The time information, however, is not limited to this, and may be any information as long as the information indicates a predetermined time serving as a reference.

In the specific example illustrated in FIG. 2B, times from roll calls indicating shooting starts to action calls indicating acting starts of takes 1 to 6 are not uniform. Nevertheless, because an actor starts acting in response to an action call, synchronization processing can be performed on the takes based on time information indicating the timing of the action call. The video processing apparatus 100 according to the present exemplary embodiment can perform synchronization processing by matching the time axes of videos of the plurality of takes of the same shot using the time information indicating the action call, as a reference time information 00:00, for example.

Next, the procedure of processing for storing an instructed focus position that is performed by the video processing apparatus 100 according to the present exemplary embodiment will be described in detail using FIGS. 3, 5, and 6A to 6C. In addition, the video processing apparatus 100 according to the present exemplary embodiment executes the processing for storing an instructed focus position (processing in FIG. 3), when performing rehearsal shooting. The execution timing, however, is not limited to this, and the video processing apparatus 100 may execute the processing for storing an instructed focus position, when performing real shooting (e.g., when performing shooting of the first take of the same shot).

A case of shooting a shot video using a studio set illustrated in FIG. 5 will be described below. In addition, FIG. 5 is a diagram illustrating an example of transition of a subject in a studio set, which is a shooting location. In addition, FIG. 5 is a diagram illustrating a case in which a studio set 501 simulating a room is viewed from a ceiling. A position 502 is a position at which shooting is performed (position at which the video processing apparatus 100 illustrated in FIG. 1 is set). The studio set 501 is provided with a door 503. A position 504 indicates a stand position of an actor A. A position 505 indicates a position at which an actor B has stopped after opening the door 503 in rehearsal shooting. In addition, a position 506 indicates a position at which the actor B has stopped after opening the door 503 in real shooting.

In the present exemplary embodiment, when shooting is started, the actor A is shot in waist shot. Furthermore, an operation corresponding to an action call is performed, and after 5 seconds from the action call, the actor B opens the door 503 to enter the room. In addition, when the operation corresponding to the action call is performed, a focus is put on the actor A. Next, after 5 seconds from the action call, a focus is put on the actor B that has entered the room.

Figure 6A:
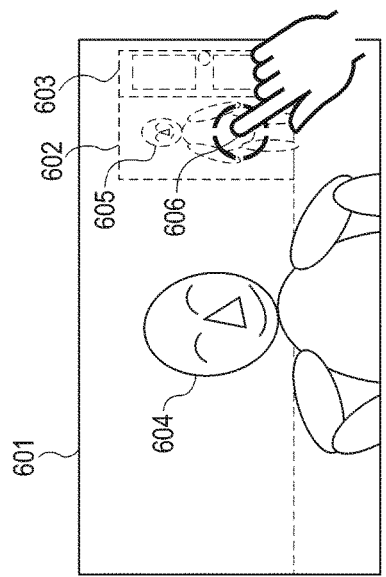
FIGS. 6A to 6C are diagrams illustrating a display screen in rehearsal shooting according to the first exemplary embodiment.
Figure 6B:
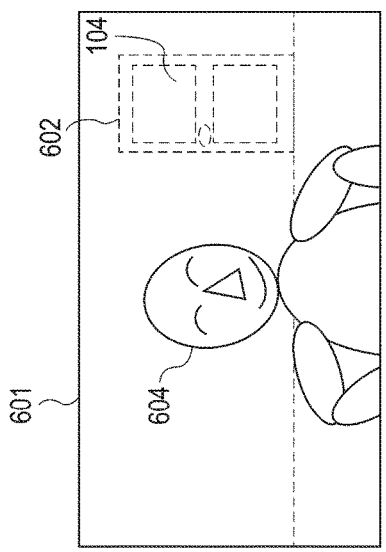
Figure 6C:
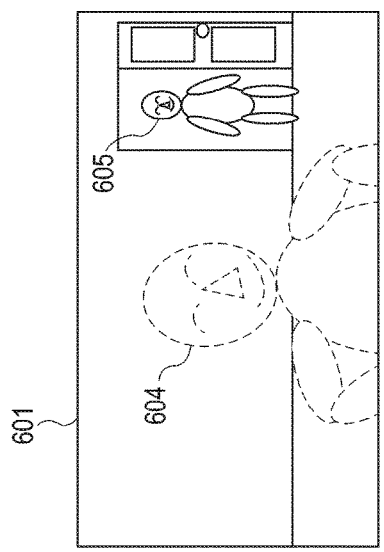

FIGS. 6A, 6B, and 6C are diagrams illustrating a display screen (an operation screen) in the display unit 103 of the video processing apparatus 100 that is displayed when an instructed focus position is stored. A display screen 601 is a display screen (an operation screen) in the display unit 103. In addition, FIGS. 6A, 6B, and 6C correspond to the lapse of time in shooting. In FIGS. 6A, 6B, and 6C, solid lines represents outlines of in-focus portions, and dotted lines represents outlines of out-of-focus portions.

FIG. 6A illustrates an image displayed in the display unit 103 when the user performs an operation corresponding to an action call (when the detection unit 109 detects the action call). When the operation corresponding to the action call is performed, as illustrated in FIG. 6A, on the display screen 601 of the display unit 103, the actor A is displayed at a position 604, and an entrance 602 provided on the studio set is displayed. In addition, as illustrated in FIG. 6A, when the operation corresponding to the action call is performed, a focus is put on the position 604 of the actor A.

FIG. 6B illustrates an image displayed in the display unit 103 after 5 seconds from the operation corresponding to the action call. After a predetermined time from the operation corresponding to the action call, the actor B enters the studio set from the entrance 602. In addition, after 5 seconds from the operation corresponding to the action call, as illustrated in FIG. 6B, on the display screen. 601, the actor B is displayed at a position 605, and the entrance 602 and a door 603 opened by the actor B are displayed. In addition, on the display screen 601, similarly to that in FIG. 6A, the actor A is displayed at the position 604. In addition, as illustrated in FIG. 6B, after 5 seconds from the operation corresponding to the action call, a focus is put on the position 604 of the actor A. Meanwhile, the focus is not put on the position 605 of the actor B, the entrance 602, and the door 603 since they are at back positions distant from the position 604 of the actor A. At this time, the user touches a position 606 on the display screen 601 for putting a focus on the position 605 of the actor B. In addition, as illustrated in FIG. 6B, the display control unit 104 displays a circular graphic (cursor mark: hereinafter, simply referred to as a cursor) at a focus position (the position 606) on the display screen 601 of the display unit 103 that has been instructed by the user.

FIG. 6C illustrates an image displayed in the display unit 103 after the focusing processing for putting a focus on the position 606 illustrated in FIG. 6B is performed. As illustrated in FIG. 6C, focus is put on the position 605 of the actor B. In addition, the focus is also put on the entrance 602 and the door 603 since the positions of the entrance 602 and the door 603 are within a predetermined range from (in vicinity of) the position 606. In addition, the focus is not put on the actor A since the position 604 of the actor A is on the outside of the predetermined range (distant) from the position 606.

Figure 3:
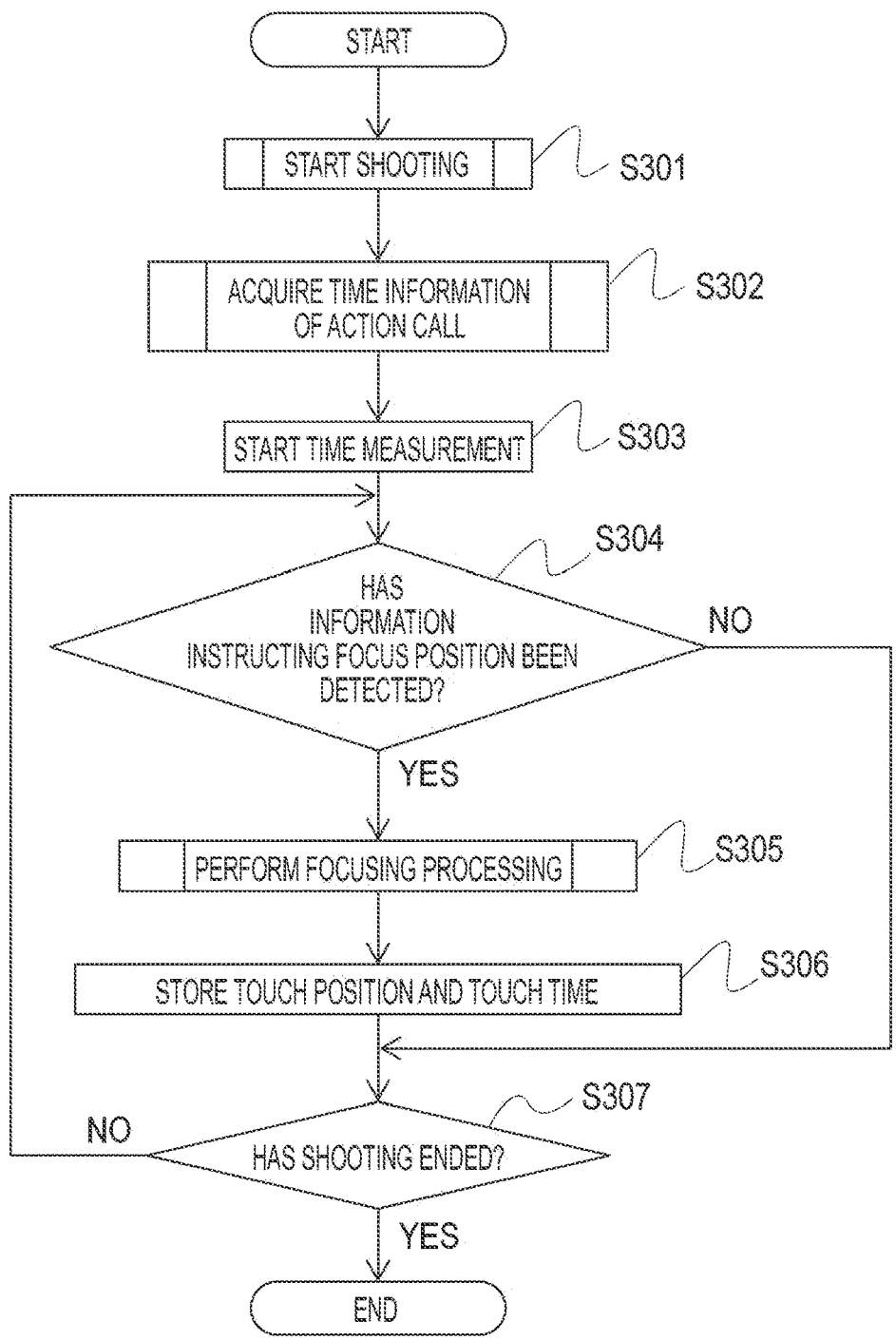
FIG. 3 is a flowchart illustrating processing for storing a focus position in rehearsal shooting according to the first exemplary embodiment.

Next, FIG. 3 is a flowchart illustrating the details of processing for storing a focus position instructed by the user that is performed by the video processing apparatus 100 according to the present exemplary embodiment.

In step S301, the video processing apparatus 100 acquires information indicating a shooting start that is provided by, for example, the user touching a predetermined position on the display unit 103. Then, the imaging unit 114 according to the present exemplary embodiment starts shooting based on the acquired information indicating a shooting start.

In step S302, the video processing apparatus 100 acquires a timing at which an action call has been detected (time information of an action call). The detection unit 109 according to the present exemplary embodiment detects an action call instructed by the user, based on audio information (voice of the user, specific sound, etc.) output from the microphone 108. Then, the detection unit 109 acquires a timing at which the action call has been detected (time information, of an action call). In addition, a method for detecting time information of an action call is not limited to a method that is based on audio information. A method of detecting time information of an action call in response to a button (not illustrated) corresponding to the action call being pressed by the user may be used. Alternatively, a method of detecting time information of an action call in response to the recognition of a gesture corresponding to the action call that is performed by the user may be used. In addition, when an action call is detected in step S302 of the present exemplary embodiment, as illustrated in FIG. 6A, a state in which a focus is put on the actor A is obtained.

In step S303, based on the time information of the action call that has been detected by the detection unit 109 in step S302, the time measurement unit 110 starts time measurement from a time point at which the action call has been detected. In other words, the detection unit 109 according to the present exemplary embodiment uses the time point at which the action call has been detected, as a start time point of time measurement (time point 00:00 illustrated in FIG. 2B).

In step S304, the video processing apparatus 100 determines whether information instructing a focus position has been acquired (detected). In addition, the input unit 106 according to the present exemplary embodiment can acquire information instructing a focus position if the display unit 103 receives an operation of instructing a focus position that is performed by the user. If it is determined in step S304 that information instructing a focus position has been acquired (YES in step S304), the video processing apparatus 100 advances the processing to step S305. On the other hand, if it is determined in step S304 that information instructing a focus position has not been acquired. (No in step S304), the video processing apparatus 100 advances the processing to step S307.

In step S305, the video processing apparatus 100 performs focusing processing based on the information instructing the focus position that has been acquired in step S304. More specifically, the input unit 106 according to the present exemplary embodiment outputs the information instructing the focus position, to the instruction unit 105. Then, based on the information instructing the focus position, the instruction unit 105 acquires information indicating a touch position, and outputs the acquired information to the focus control unit 107. Here, the touch position is position corresponding to the information instructing the focus position, and is a focus position on the display screen 601 of the display unit 103 that has been touched (instructed) by the user. Then, based on the information indicating the touch position, the focus control unit 107 performs processing for driving the lens 102 so that a focus is put on a subject existing at the touch position (focusing processing). Through the processing, a focus can be put on a subject corresponding to a touch position on a screen of the display unit 103 of the video processing apparatus 100. In addition, when information instructing a focus position is acquired in the present exemplary embodiment, as illustrated in FIG. 6B, a cursor is displayed at the instructed position 606 on the display screen 601 of the display unit 103.

In step S306, the storage unit 111 stores the information indicating the instructed focus position (touch position) and information indicating a timing at which the information instructing the focus position has been acquired (touch time). More specifically, the storage unit 111 stores information indicating the touch position that has been output from the instruction unit 105, and information indicating the touch time that has been output from the time measurement unit 110. Here, the touch time refers to a time from a time measurement start in step 303 to when information instructing a focus position is acquired in step S304. In other words, the video processing apparatus 100 according to the present exemplary embodiment stores the position 606 illustrated in FIG. 6B, as information indicating a touch position, and stores a time from an action call to when the position 606 is instructed by the user (5 seconds in this example), as information indicating a touch time. In addition, the video processing apparatus 100 according to the present exemplary embodiment stores information indicating a touch position and information indicating a touch time in association with each other.

In step S307, the video processing apparatus 100 determines whether shooting has ended. If it is determined in step S307 that shooting has not ended. (No in step S307), the video processing apparatus 100 returns to the processing in step S304. On the other hand, if it is determined in step S307 that shooting has ended (YES in step S307), the video processing apparatus 100 ends the processing for storing an instructed focus position.

In the above-described manner, the video processing apparatus 100 according to the present exemplary embodiment can store an instructed focus position. In addition, after the shooting has ended in step S307, the video processing apparatus 100 may save a file obtained by compiling information stored in step S306 for 1 shot video i.e., for 1 rehearsal, 1 take), and the like into the storage unit 111 or another memory (not illustrated).

Next, the procedure of focusing processing that is executed by the video processing apparatus 100 according to the present exemplary embodiment based on a stored focus position will be described in detail using FIGS. 4 and 7A to 7C. In addition, the video processing apparatus 100 according to the present exemplary embodiment executes, in real shooting (the first take of the same shot), the focusing processing that is executed based on a stored focus position (processing in FIG. 4). The execution timing, however, is not limited to this, and the video processing apparatus 100 is only required to execute the focusing processing (processing in FIG. 4) based on a stored focus position after the processing for storing an instructed focus position (processing in FIG. 3). For example, if processing for storing an instructed focus position is executed in the shooting of the first take of the same shot, the focusing processing that is based on a stored focus position is executed in the shooting of the second and subsequent takes. In addition, similarly to the case of performing the processing illustrated in FIG. 3, a shot video is shot using the studio set illustrated in FIG. 5.

Figure 7A:
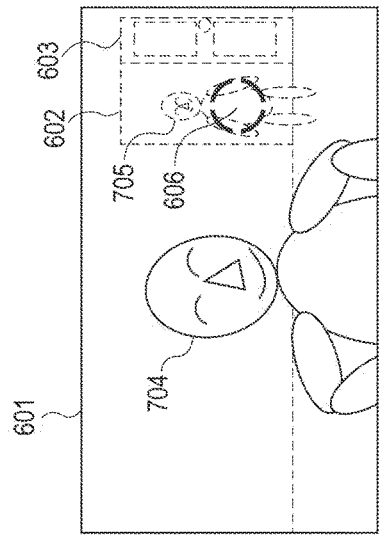
FIGS. 7A to 7C are diagrams illustrating a display screen in real shooting according to the first exemplary embodiment.
Figure 7B:
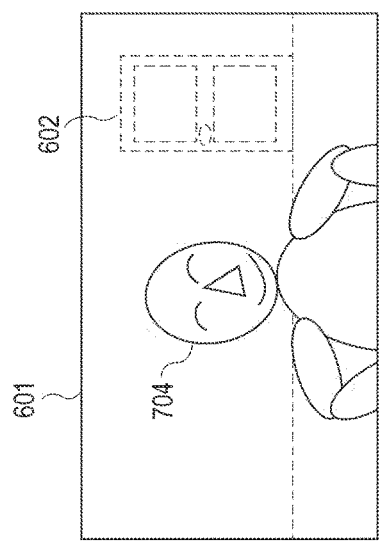
Figure 7C:
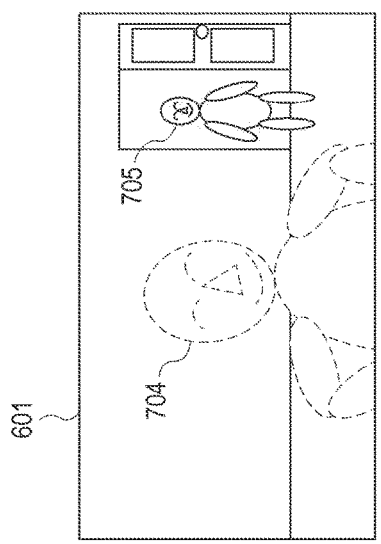

First, FIGS. 7A, 7B, and 7C are diagrams illustrating the display screen 601 in the display unit 103 of the video processing apparatus 100 that is displayed when the focusing processing is performed based on a stored focus position. In addition, FIGS. 7A, 7B, and 7C correspond to the lapse of time in shooting. In addition, in FIGS. 7A, 7B, and 7C, solid lines represents outlines of in-focus portions, and dotted lines represents outlines of out-of-focus portions.

FIG. 7A illustrates an image displayed in the display unit 103 when the user performs an operation corresponding to an action call (when the detection unit 109 detects the action call). As illustrated in FIG. 7A, when the operation corresponding to the action call is performed, a focus is put on a position 704 of the actor A.

FIG. 7B illustrates an image displayed in the display unit 103 after 5 seconds from the operation corresponding to the action call. As illustrated in FIG. 7B, on the display screen 601 of the display unit 103, the actor B is displayed at a position 705, and the entrance 602 and the door 603 opened by the actor B are displayed. In addition, on the display screen 601, similarly to that in FIG. 7A, the actor A is displayed at the position 704. In addition, as illustrated in FIG. 7B, after 5 seconds from the operation corresponding to the action call, similarly to rehearsal shooting, the focus is not put on the position 705 of the actor B, the entrance 602, and the door 603 since they are at back positions distant from the position 704 of the actor A. In addition, as illustrated in FIG. 7B, after 5 seconds from the operation corresponding to the action call, a cursor is displayed at the position 606 corresponding to information indicating a touch position that has been read in real shooting.

FIG. 7C illustrates an image displayed in the display unit 103 after the focusing processing for putting a focus on the position 606 illustrated in FIG. 7B is performed. As illustrated in FIG. 7C, a focus is put on the position 705 of the actor B. In addition, the focus is not put on the actor A since the position 704 of the actor A is on the outside of the predetermined range (distant) from the position 606.

Figure 4:
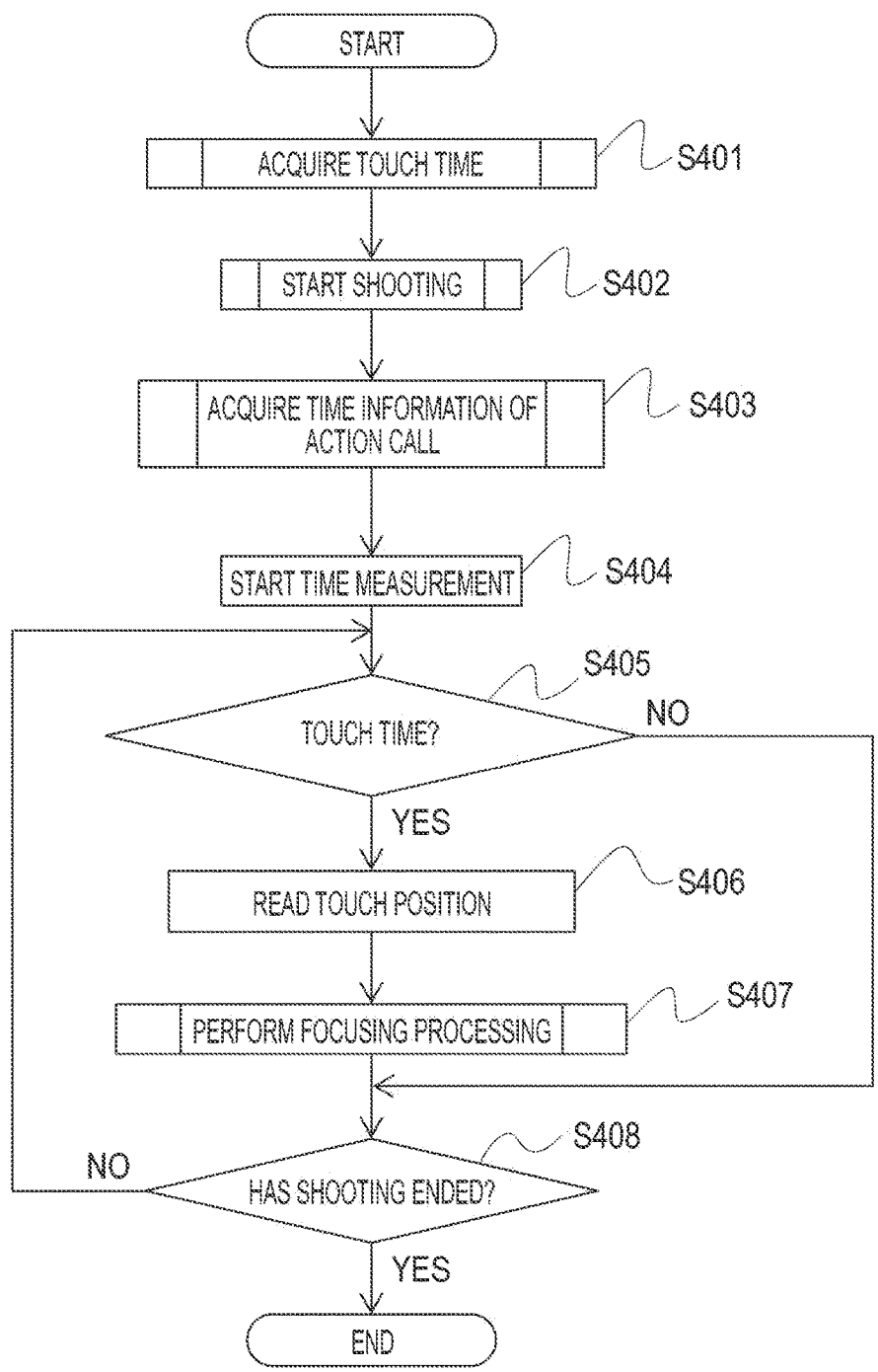
FIG. 4 is a flowchart illustrating focusing processing in real shooting according to the first exemplary embodiment.

Next, FIG. 4 is a flowchart illustrating the details of the focusing processing that is executed by the video processing apparatus 100 according to the present exemplary embodiment based on a stored focus position.

In step S401, the video processing apparatus 100 acquires information indicating a touch time that is stored in the storage unit 111. In the present exemplary embodiment, when the focusing processing that is based on a stored focus position is started, the shooting instruction unit 112 outputs, to the overall control unit 101, retake information indicating that shooting similar to shooting in which processing for storing an instructed focus position (processing in FIG. 3) has been performed is to be performed. Then, the overall control unit 101 acquires information indicating a touch time that is stored in the storage unit 111. In this example, a touch time stored in step S306 in FIG. 3 (5 seconds) is acquired.

In addition, the video processing apparatus 100 according to the present exemplary embodiment performs real shooting corresponding to rehearsal shooting in which the processing in FIG. 3 has been performed. Thus, the video processing apparatus 100 acquires the information stored in the storage unit 111 in the rehearsal shooting (information indicating a touch position and/or a touch time). Nevertheless, information to be acquired is not limited to this. When the processing in FIG. 3 is performed in the shooting of a first video (for example, take 1), and the processing in FIG. 4 is performed in the shooting of a second video (for example, take 2) of the same shot as the first video, the video processing apparatus 100 is only required to acquire information stored in the shooting in which the processing in FIG. 3 has been performed.

In addition, if the processing in FIG. 3 is performed in the shootings of a plurality of videos (for example, takes 1 and 2 of the same shot), and then the processing in FIG. 4 is performed in the shooting of a video (for example, take 3) of the same shot, the video processing apparatus 100 according to the present exemplary embodiment performs the following processing. More specifically, the video processing apparatus 100 according to the present exemplary embodiment acquires information stored in the last shooting (shooting of take 2) out of shootings of the videos (takes 1 and 2) in which the processing in FIG. 3 has been performed. In addition, the configuration of the video processing apparatus 100 according to the present exemplary embodiment is not limited to this. The video processing apparatus 100 may be configured to, if the processing in FIG. 3 is performed in the shootings of a plurality of videos, store a plurality of pieces of information stored in the shootings of the plurality of videos, and to select information from among plurality of pieces of stored information when performing the processing in FIG. 4.

The processes in steps S402 to S404 are processes similar to the respective processes in steps S301 to 303 in FIG. 3. Thus, the description thereof will be omitted. In addition, when an action call is detected in step S403 of the present exemplary embodiment, the image illustrated in FIG. 7A is displayed on the display screen 601. At this time, as illustrated in FIG. 7A, a focus is put on the actor A.

In step S405, the video processing apparatus 100 compares a time measured by the time measurement unit 110, with a touch time acquired in step S401. In this step, if it is determined that the time measured by the time measurement unit 110 does not match the touch time acquired in step S401 (No in step S405), the video processing apparatus 100 advances the processing to step S408, in which the video processing apparatus 100 determines whether shooting has ended.

On the other hand, if it is determined in step S405 that the time measured by the time measurement unit 110 matches the touch time acquired in step S401 (YES in step S405), the video processing apparatus 100 advances the processing to step S406. The video processing apparatus 100 according to the present exemplary embodiment determines that the time measured by the time measurement unit 110 matches the touch time acquired in step S401, when the time measured by the time measurement unit 110 is 5 seconds (i.e., 5 seconds after the action call). Then, the video processing apparatus 100 advances the processing to step S406.

In step S406, the video processing apparatus 100 acquires information indicating a touch position that is stored in the storage unit 111. More specifically, the coordinate acquisition unit 113 according to the present exemplary embodiment acquires (reads, calls) information indicating a touch position that is saved in the storage unit 111. In addition, the information indicating a touch position is information corresponding to the information indicating a touch time that has been acquired in step S401. In this example, a touch position (the position 606) stored in step S306 in FIG. 3 is acquired. Then, the coordinate acquisition unit 113 outputs the acquired information indicating a touch position, to the instruction unit 105. Furthermore, the instruction unit 105 outputs the information indicating a touch position, to the focus control unit 107. In addition, when the information indicating a touch position has been acquired in step S406 of the present exemplary embodiment, as illustrated in FIG. 7B, the video processing apparatus 100 displays a cursor at the position. 606 on the display screen 601 of the display unit 103 that corresponds to the information indicating a touch position.

In step S407, the video processing apparatus 100 performs focusing processing based on the information indicating a touch position that has been acquired from the storage unit 111 in step S406. More specifically, the focus control unit 107 according to the present exemplary embodiment performs processing for driving the lens 102 so that a focus is put on an actual subject corresponding to the touch position acquired from the instruction unit 105 (focusing processing). In other words, according to an actual distance between the imaging unit 114 and the actual subject, the focus control unit 107 performs focusing processing while performing adjustment so that a focus is put on the subject. At this time, if the position of the subject is shifted from the acquired touch position, adjustment is performed so that a focus is put on the position of the actual subject, and then, the focusing processing is performed. Through the processing, a focus can be put on a subject corresponding to a touch position on a screen of the display unit 103 of the video processing apparatus 100

In step S408, similarly to the processing in step S307 in FIG. 3, the video processing apparatus 100 determines whether shooting has ended. Then, if it is determined in step S408 that shooting has not ended (No in step S408), the video processing apparatus 100 returns to the processing in step S405. On the other hand, if it is determined in step S408 that shooting has ended (YES in step S408), the video processing apparatus 100 ends the focusing processing that is based on a stored focus position.

Through the processing in FIG. 4, the video processing apparatus 100 according to the present exemplary embodiment can put a focus on the actor B even if a stand position of the actor B in real shooting (the position 506 in FIG. 5) differs from a stand position of the actor B in rehearsal shooting (the position 505 in FIG. 5). In other words, as illustrated in FIG. 5, even if the distances from a shooting position (the position 502) are different (the position 506 is on the rear side of the position 505), in step S407, focusing processing is performed with respect to the touch position (the position 606) on the display screen 601. The video processing apparatus 100 according to the present exemplary embodiment can thereby put a focus on the actor B.

As described above, according to the video processing apparatus of the present exemplary embodiment, a focus can be put on a subject existing at a position different from a prestored focus position.

In addition, after the video processing apparatus 100 according to the present exemplary embodiment acquires a touch time in step S401 in FIG. 4, the video processing apparatus 100 acquires a touch position in step S406. The acquisition timing, however, is not limited to this. In other words, the video processing apparatus 100 is only required to acquire a touch position before performing focusing processing in step S407. For example, the video processing apparatus 100 may acquire a touch time and a touch position in step S401.

In conventional focusing processing, a distance between a position of an imaging apparatus for performing shooting and a position at which a subject is planned to stand is measured in advance, and a focus position that is based on the measured distance is stored as a preset position. In contrast to this, the video processing apparatus of the present exemplary embodiment stores information indicating an instructed focus position (touch position) and a time at which the information instructing the focus position has been acquired (touch time) in advance (in rehearsal shooting). In other words, the video processing apparatus of the present exemplary embodiment stores a focus position on a shooting screen instead of distance information. With this configuration, the video processing apparatus of the present exemplary embodiment can appropriately perform focusing processing even if the position of a subject varies when shooting is performed again (in real shooting). Furthermore, the video processing apparatus of the present exemplary embodiment can appropriately perform focusing processing even without a measurement device used for measuring a distance in conventional focusing processing.

In addition, in some techniques for performing conventional focusing processing, a plurality of focus positions is prestored as preset positions, and focusing processing is performed based on a preset position selected from among the plurality of stored preset positions. On the other hand, the video processing apparatus of the present exemplary embodiment stores a time at which information instructing a focus position has been acquired (touch time), in association with the instructed focus position (touch position). Through the processing, the video processing apparatus of the present exemplary embodiment can read a touch position at an appropriate timing, and perform focusing processing. With this configuration, if a plurality of touch positions is stored, the video processing apparatus the present exemplary embodiment can appropriately perform focusing processing by using a touch time, without receiving, from the user, an operation of selecting a touch position to be used, from among the plurality of touch positions.

Second Exemplary Embodiment

The above-described video processing apparatus 100 according to the first exemplary embodiment performs the following processing when information instructing a focus position is input during shooting. More specifically, the video processing apparatus 100 according to the first exemplary embodiment stores information indicating an instructed focus position (touch position) and information indicating a timing at which the information instructing a focus position has been acquired (touch time). Then, when performing subsequent shooting (for example, similar shooting), the video processing apparatus 100 according to the first exemplary embodiment reads the stored information indicating a touch position and information indicating a touch time, and performs focusing processing for putting a focus on the touch position corresponding to the touch time. A video processing apparatus 100 according to the second exemplary is configured to, when performing similar shooting, perform object detection with respect to a range within a predetermined distance from (in vicinity of) a touch position corresponding to a touch time, and perform focusing processing based on a detection result.

Figure 8:
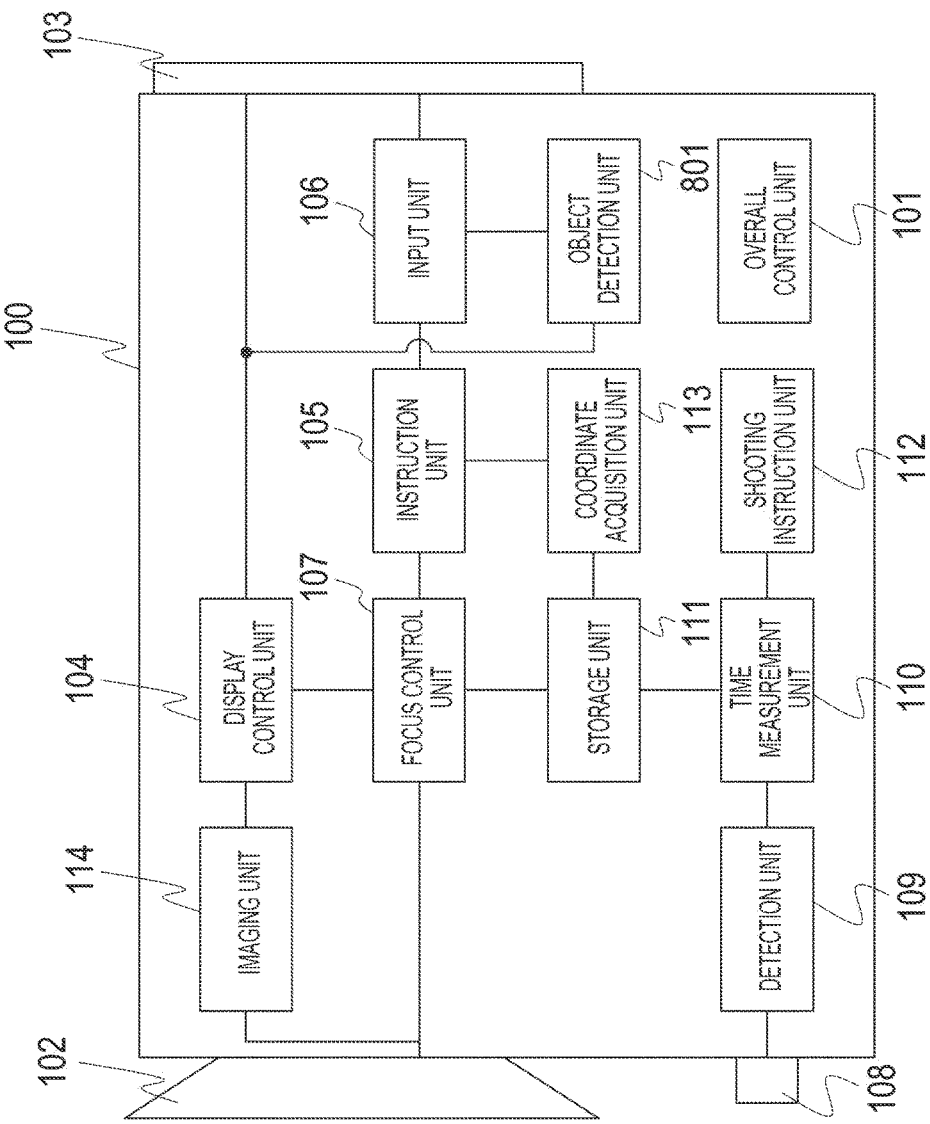
FIG. 8 is a block diagram illustrating a configuration example of a video processing apparatus according to a second exemplary embodiment.

FIG. 8 is a diagram illustrating a configuration example of a video processing apparatus according to the present exemplary embodiment. In addition, in FIG. 8 of the present exemplary embodiment, the units having the same functions as the respective units in FIG. 1 of the first exemplary embodiment are assigned the same reference numerals, and the description thereof will be omitted. The video processing apparatus 100 according to the present exemplary embodiment differs from the video processing apparatus 100 according to the first exemplary embodiment that is illustrated in FIG. 1, in that an object detection unit 801 is included. The object detection unit 801 acquires an image (a video) captured by the imaging unit 114, and detects an object from a range within a predetermined distance from a touch position (predetermined range around a touch position) in the acquired image.

In addition, in the present exemplary embodiment, the object detection unit 801 detects a human body as an object, but the type of an object to be detected is not limited to this. For example, the object detection unit 801 may detect a human body, a face, a substance, a character, a region with a specific shape or a specific color, or the like, as an object. In addition, as a method for detecting an object from an image, for example, there is a method of extracting a feature point from an image, a method of detecting a motion using a plurality of images, and the like. The detection method is not limited to these methods. For example, when the type of an object to be detected is a face, the object detection unit 801 can detect a face by extracting, from an image, feature points, outlines, or the like that correspond to eyes, a nose, a mouse, and the like. In addition, the input unit 106 may acquire the type of an object to be detected by the object detection unit 801, by receiving an operation performed by the user, and the object detection unit 801 may perform object detection based on the acquired type of an object.

The video processing apparatus 100 according to the present exemplary embodiment performs processing for storing an instructed focus position, similarly to the processing in the first exemplary embodiment that is illustrated in FIGS. 3 and 6A to 6C. Thus, the description thereof will be omitted.

Next, the procedure of focusing processing that is executed by the video processing apparatus 100 according to the present exemplary embodiment based on a stored focus position will be described in detail using FIGS. 9 and 10A to 10C. In addition, the video processing apparatus 100 according to the present exemplary embodiment executes, in real shooting (the first take of the same shot), the focusing processing that is executed based on a stored focus position (processing in FIG. 9). The execution timing, however, is not limited to this, and the video processing apparatus 100 is only required to execute the focusing processing (processing in FIG. 9) based on a stored focus position after the processing for storing an instructed focus position (processing in FIG. 3). For example, if processing for storing an instructed focus position is executed in the shooting of the first take of the same shot, the focusing processing that is based on a stored focus position is executed in the shooting of the second and subsequent takes. In addition, similarly to the case of performing the processing illustrated in FIG. 3, a shot video is shot using the studio set illustrated in FIG. 5.

Figure 10A:
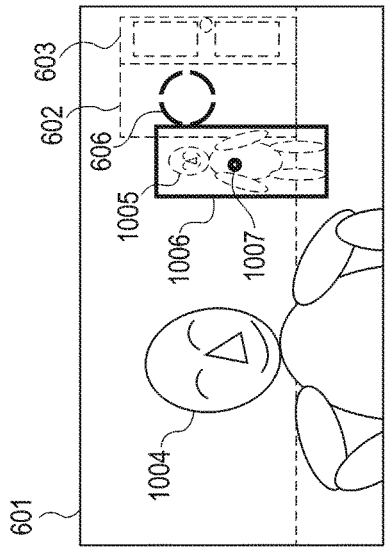
FIGS. 10A to 10C are diagrams illustrating a display screen in real shooting according to the second exemplary embodiment.
Figure 10B:
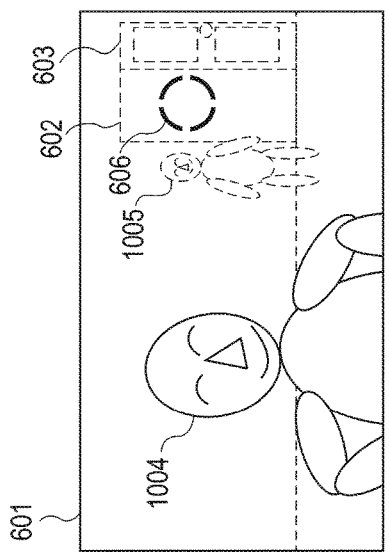
Figure 10C:
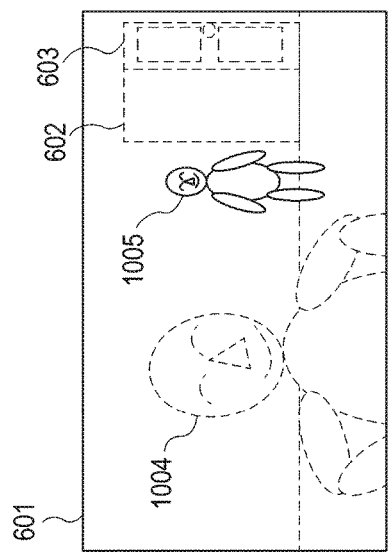

First, FIGS. 10A, 10B, and 10C are diagrams illustrating the display screen 601 in the display unit 103 of the video processing apparatus 100 that is displayed when the focusing processing is performed based on a stored focus position. In addition, FIGS. 10A, 10B, and 10C correspond to the lapse of time in shooting. In addition, in FIGS. 10A, 10B, and 10C, solid lines represents outlines of in-focus portions, and dotted lines represents outlines of out-of-focus portions.

FIG. 10A illustrates an image displayed in the display unit 103 when the video processing apparatus 100 reads a touch position. In other words, FIG. 10A illustrates an image displayed in the display unit 103 when a time corresponding to a read touch time has elapsed from when an operation corresponding to an action call has been detected. As illustrated in FIG. 10A, on the display screen 601 of the display unit 103, the actor B is displayed at a position 1005, and the entrance 602 and the door 603 opened by the actor B are displayed. In addition, on the display screen 601, the actor A is displayed at a position 1004. Furthermore, as illustrated in FIG. 10A, a cursor is displayed on the display screen 601 at the position 606 corresponding to information indicating a touch position. In addition, in the example illustrated in FIG. 10A, a focus is not put on the actor B since the position 1005 of the actor B is on the outside of a predetermined range from the touch position (the position 606).

FIG. 10B is a diagram illustrating the display screen 601 in the display unit 103 of the video processing apparatus 100 that is displayed when an object is detected in a range within a predetermined distance from (in vicinity of) the touch position (the position 606). In addition, a frame 1006 indicates a range which the object detection unit 801 has detected an object (the actor B).

FIG. 10C illustrates an image displayed in the display unit 103 after focusing processing has been performed based on an object detection result. As illustrated in FIG. 10C, a focus is put on the position 1005 of the actor B. In addition, the position 1004 of the actor A is in a range larger than the predetermined distance (distant) from the position 606, and on the outside of an object detection target range. Thus, focusing processing is not performed with respect to the actor A, and a focus is not put on the actor A.

Figure 9:
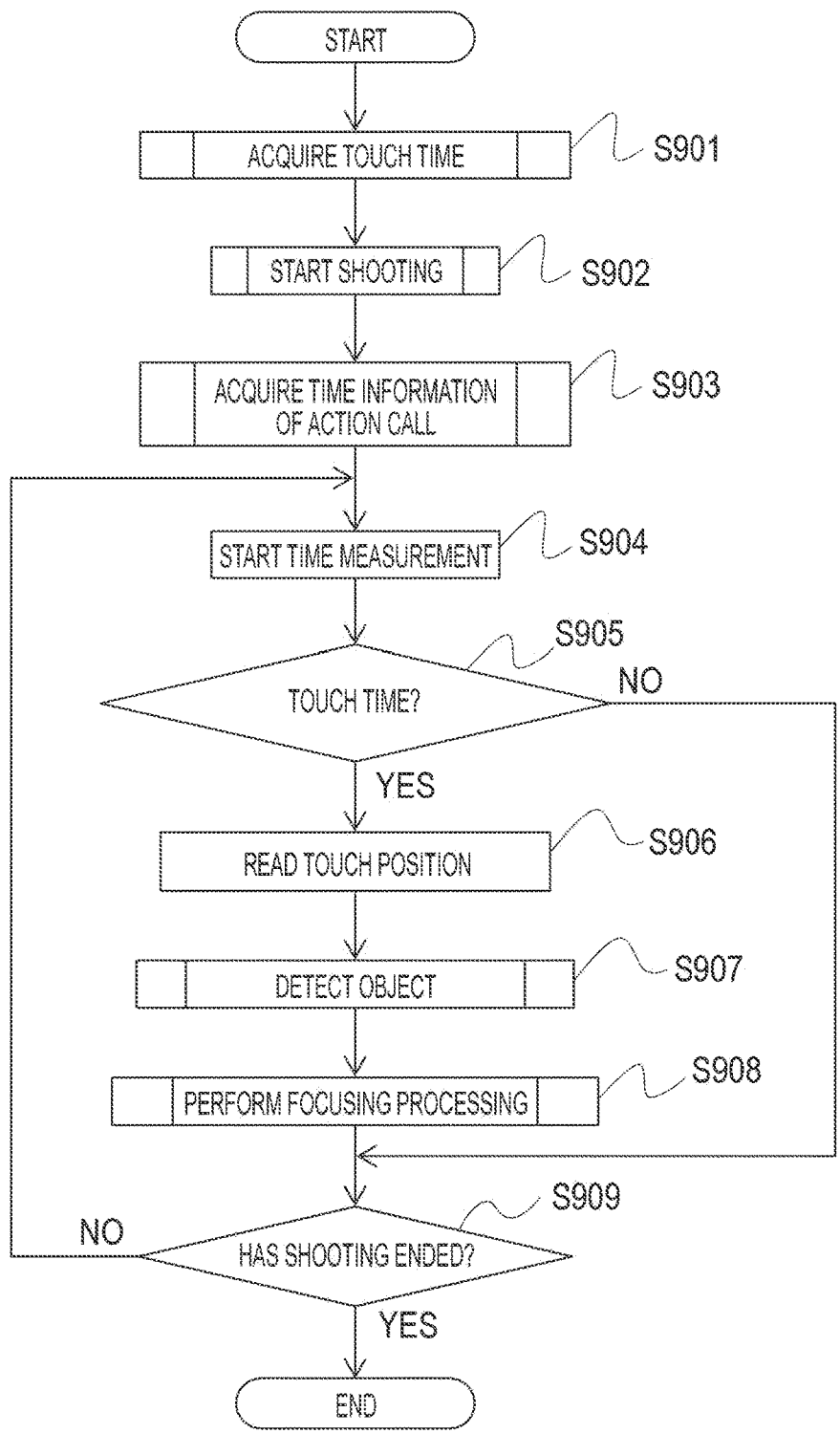
FIG. 9 is a flowchart illustrating focusing processing in real shooting according to the second exemplary embodiment.

Next, FIG. 9 is a flowchart illustrating the details of the focusing processing that is executed by the video processing apparatus 100 according to the present exemplary embodiment based on a stored focus position.

The processes in steps S901 to S906 in FIG. 9 are processes similar to the respective processes in steps S401 to S406 in FIG. 4 in the first exemplary embodiment. Thus, the description thereof will be omitted. In other words, the video processing apparatus 100 according to the present exemplary embodiment can acquire information indicating a touch position that is stored in the storage unit 111, through the processes in steps S901 to S906. In this example, similarly to the first exemplary embodiment, information indicating a touch position (the position 606) that is stored in step S306 in FIG. 3 is acquired. In addition, when information indicating a touch position has been read in step S906 of the present exemplary embodiment, as illustrated in FIG. 10A, the video processing apparatus 100 displays a cursor at the position 606 on the display screen 601 of the display unit 103 that corresponds to the information indicating a touch position. At this time, as illustrated in FIG. 10A, a focus is not put on the actor B since position 1005 of the actor B that has entered the frame is on the outside of the predetermined range from the touch position (the position 606), unlike the position of the actor B in rehearsal shooting.

In step S907, the video processing apparatus 100 performs object detection based on information indicating a touch position that has been acquired from the storage unit 111 in step S906. More specifically, in the present exemplary embodiment, the object detection unit 801 performs object detection processing in a range within the predetermined distance from (in vicinity of) the touch position. In addition, if an object is detected in step S907 of the present exemplary embodiment, as illustrated in FIG. 10B, on the display screen 601 of the display unit 103, the frame 1006 indicating the range in which the object has been detected is displayed. In addition, FIG. 10B indicates that the actor B included in the frame 1006 has been detected as an object.

In step S908, the video processing apparatus 100 performs focusing processing based on an object detection result obtained in step S907. More specifically, the video processing apparatus 100 according to the present exemplary embodiment acquires the position of the object detected in step S907, and performs focusing processing with respect to the range that is based on the acquired position. When the focusing processing is performed in step S908 according to the present exemplary embodiment, as illustrated in FIG. 10C, an image in which a focus is put on the position 1005 of the actor B is displayed on the display screen 601 of the display unit 103. In addition, the video processing apparatus 100 according to the present exemplary embodiment uses the position of an object as a center point of the object. This corresponds to, for example, a center point 1007 of the frame 1006 of the detected object that is illustrated in FIG. 10B. For example, the video processing apparatus 100 according to the present exemplary embodiment uses the center point 1007 of the framer 1006 of the detected object that is illustrated in FIG. 10B, as a position of the object. The position of an object, however, is not limited to a center point of the object. As a position of an object, an end point and/or region of the object may be used, or a predetermined point and/or region within a range of the object may be used.

The process in step S909 and a subsequent process are similar to the process in step S408 and a subsequent process in FIG. 4 in the first exemplary embodiment. Thus, the description thereof will be omitted.

Through the processing in FIG. 9, the video processing apparatus 100 according to the present exemplary embodiment can put a focus on the actor B even if a stand position of the actor B in real shooting (the position 1005 in FIGS. 10A, 10B, and 10C) differs from a position corresponding to information indicating a touch position (the position 606 in FIGS. 10A, 10B, and 10C). In other words, as illustrated in FIGS. 10A, 10B, and 10C, by performing object detection with respect to a range in vicinity of the touch position (the position 606) in step S907, focusing processing is performed with respect to a region on the display screen 601 where an object has been detected (the frame 1006). As a result, the video processing apparatus 100 according to the present exemplary embodiment can put a focus on the actor B.

In addition, the video processing apparatus 100 according to the present exemplary embodiment does not perform focusing processing in step S908 if the video processing apparatus 100 has failed to detect an object in step S907 in a range that is based on the touch position. The configuration of the video processing apparatus 100 according to the present exemplary embodiment, however, is not limited to this. For example, if the video processing apparatus 100 has failed to detect an object in step S907, in step S908, the video processing apparatus 100 may perform focusing processing so that a focus is put on a touch position acquired in step S906. Alternatively, if the video processing apparatus 100 has failed to detect an object in step S907 in a range that is based on the touch position, the video processing apparatus 100 may perform object detection processing with respect to a range outside the range that is based on the touch position. Then, in step S908, the video processing apparatus 100 may perform focusing processing so that a focus is put on an object at a position closest to the touch position, among objects detected outside the range that is based on the touch position.

As described above, according to the video processing apparatus of the present exemplary embodiment, a focus can be put on a subject existing at a position different from a prestored focus position.

Furthermore, according to the video processing apparatus of the present exemplary embodiment, if a prestored touch position on a display screen differs from a position of a subject, by performing object detection with respect to a region in vicinity of a touch position, focusing processing can be performed with respect to a subject existing in vicinity of the touch position.

In addition, the video processing apparatus of the present exemplary embodiment can appropriately perform focusing processing even without a measurement device used for measuring a distance in conventional focusing processing.

In addition, when a plurality of touch positions is stored, the video processing apparatus of the present exemplary embodiment can appropriately perform focusing processing by using a touch time, without receiving, from the user, an operation of selecting a touch position to be used, from among the plurality of touch positions.

Third Exemplary Embodiment

The above-described video processing apparatus 100 according to the first exemplary embodiment reads stored information indicating a touch position and information indicating a touch time, and performs focusing processing of putting a focus on the touch position corresponding to the touch time. In addition, the video processing apparatus 100 according to the second exemplary embodiment reads stored information indicating a touch position and information indicating a touch time, performs object detection within a specific range from the touch position, and performs focusing processing of putting a focus on a position that is based on a detection result. A video processing apparatus according to a third exemplary embodiment reads stored information indicating a touch position, and displays preannouncement information in a time period before and after a touch time corresponding to the touch position (from a predetermined time before the touch time to a predetermined time after the touch time). In addition, the video processing apparatus according to the present exemplary embodiment displays, as preannouncement information, a cursor corresponding to the touch position, and counter information that is based on the touch time.

Figure 11:
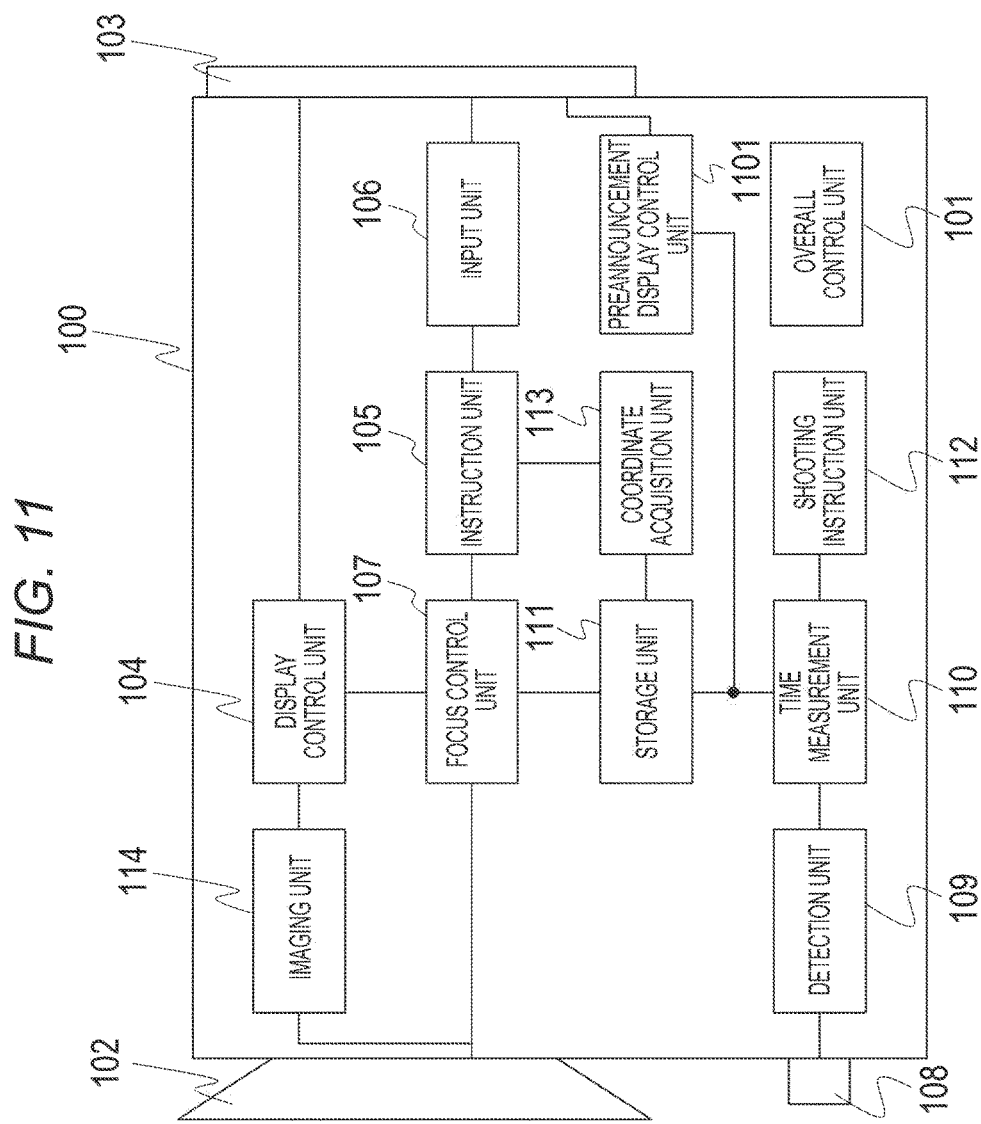
FIG. 11 is a block diagram illustrating a configuration example of a video processing apparatus according to a third exemplary embodiment.

FIG. 11 is a diagram illustrating a configuration example of a video processing apparatus according to the present exemplary embodiment. In addition, in FIG. 11 of the present exemplary embodiment, the units having the same functions as the respective units in FIG. 1 of the first exemplary embodiment are assigned the same reference numerals, and the description thereof will be omitted. The video processing apparatus 100 according to the present exemplary embodiment differs from the video processing apparatus 100 according to the first exemplary embodiment that is illustrated in FIG. 1, in that a preannouncement display control unit 1101 is included. The preannouncement display control unit 1101 performs control so as to display preannouncement information at a position on the display screen 601 of the display unit 103 that corresponds to information indicating a touch position that is stored in the storage unit 111. Here, the preannouncement display control unit 1101 according to the present exemplary embodiment performs control so as to display preannouncement information on the display unit 103 with being superimposed on an image output from the display control unit 104. In addition, in the video processing apparatus 100 according to the present exemplary embodiment, the preannouncement display control unit 1101 performs control so as to display preannouncement information on the display unit 103. The configuration of the video processing apparatus 100, however, is not limited to this. For example, the display control unit 104 may have the function of the preannouncement display control unit 1101.

The video processing apparatus 100 according to the present exemplary embodiment performs processing for storing an instructed focus position, similarly to the processing in first exemplary embodiment that is illustrated in FIGS. 3 and 6A to 6C. Thus, the description thereof will be omitted.

Next, the procedure of focusing processing that is executed by the video processing apparatus 100 according to the present exemplary embodiment based on a stored focus position will be described in detail using FIGS. 12 and 13A to 13C. In addition, the video processing apparatus 100 according to the present exemplary embodiment executes, in real shooting (the first take of the same shot), the focusing processing that is executed based on a stored focus position (processing in FIG. 12). The execution timing, however, is not limited to this, and the video processing apparatus 100 is only required to execute the focusing processing (processing in FIG. 12) based on a stored focus position after the processing for storing an instructed focus position (processing in FIG. 3). For example, if processing for storing an instructed focus position is executed in the shooting of the first take of the same shot, the focusing processing that is based on a stored focus position is executed in the shooting of the second and subsequent takes. In addition, similarly to the case of performing the processing illustrated in FIG. 3, a shot video is shot using the studio set illustrated in FIG. 5.

Figure 13A:
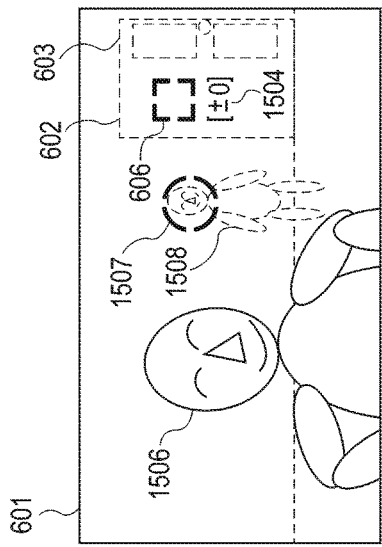
FIGS. 13A to 13C are diagrams illustrating a display screen in real shooting according to the third exemplary embodiment.
Figure 13B:
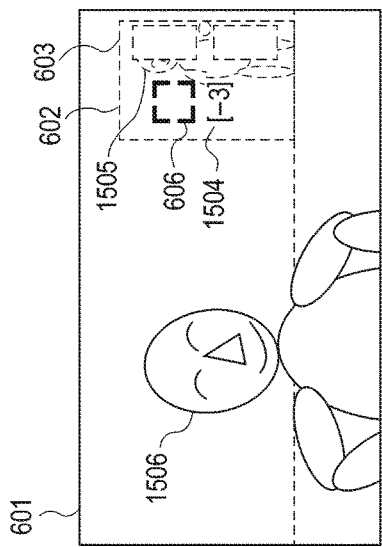
Figure 13C:
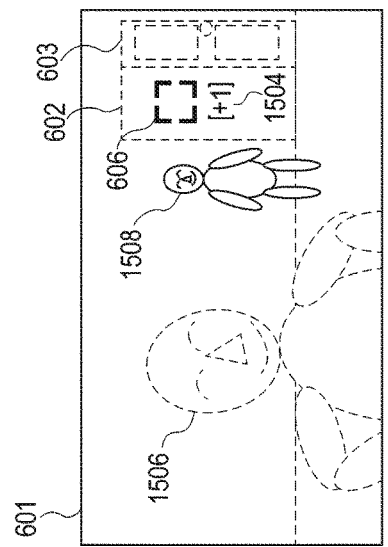

First, FIGS. 13A, 13B, and 13C are diagrams illustrating the display screen 601 in the display unit 103 of the video processing apparatus 100 that is displayed when the focusing processing is performed based on a stored focus position. In addition, FIGS. 13A, 13B, and 13C correspond to the lapse of time in shooting. In addition, in FIGS. 13A, 13B, and 13C, solid lines represents outlines of in-focus portions, and dotted lines represents outlines of out-of-focus portions.

FIG. 13A illustrates an image displayed in the display unit 103 a predetermined time before (in this example, 3 seconds before) a touch time. As illustrated in FIG. 13A, on the display screen 601 of the display unit 103, the actor B is displayed at a position 1505, and the entrance 602 and the door 603 opened by the actor B are displayed. In addition, on the display screen 601, the actor A is displayed at a position 1506. Furthermore, as illustrated in FIG. 13A, on the display screen 601, a frame indicating preannouncement information is displayed at the position 606 corresponding to information indicating a touch position. In addition, on the display screen 601, count information 1504 is displayed based on a touch time and time information acquired from the time measurement unit 110. The count information 1504 is information indicating a remaining time before a touch time (i.e., a time at which information instructing a focus position has been input in rehearsal shooting). In addition, the count information 1504 according to the present exemplary embodiment that is illustrated in FIG. 13A is displayed as [−3], and indicates that 3 seconds left before the touch time.

FIG. 13B illustrates an image displayed in the display unit 103 when the time acquired from the time measurement unit 110 matches a read touch time. As illustrated in FIG. 13B, on the display screen 601 of the display unit 103, the actor B is displayed at a position 1508. In addition, as illustrated in FIG. 13B, a cursor illustrated at a position 1507 corresponds to a touch position newly instructed by the user, and indicates that information instructing the position 1507 as a focus position has been input. In addition, FIG. 13B illustrates an image displayed at a time matching the read touch time, and in FIG. 13B, the count information 1504 is displayed as [±0].

FIG. 13C illustrates an image displayed in the display unit 103 after focusing processing has been performed (in this example, 1 second after the touch time). As illustrated in FIG. 13C, a focus is put on the actor B existing at the position 1508, based on the touch position newly instructed by the user.

In addition, the video processing apparatus 100 according to the present exemplary embodiment may be configured to change a shape or color of preannouncement information (the count information 1504 and/or the cursor at the position 606) based on a time acquired from the time measurement unit 110 and a touch time. By changing the shape or color in this manner, preannouncement information of a time period closer to a touch time can be made more noticeable than preannouncement information of a time period remoter from the touch time, so that display with high visibility for the user can be performed.

Figure 12:
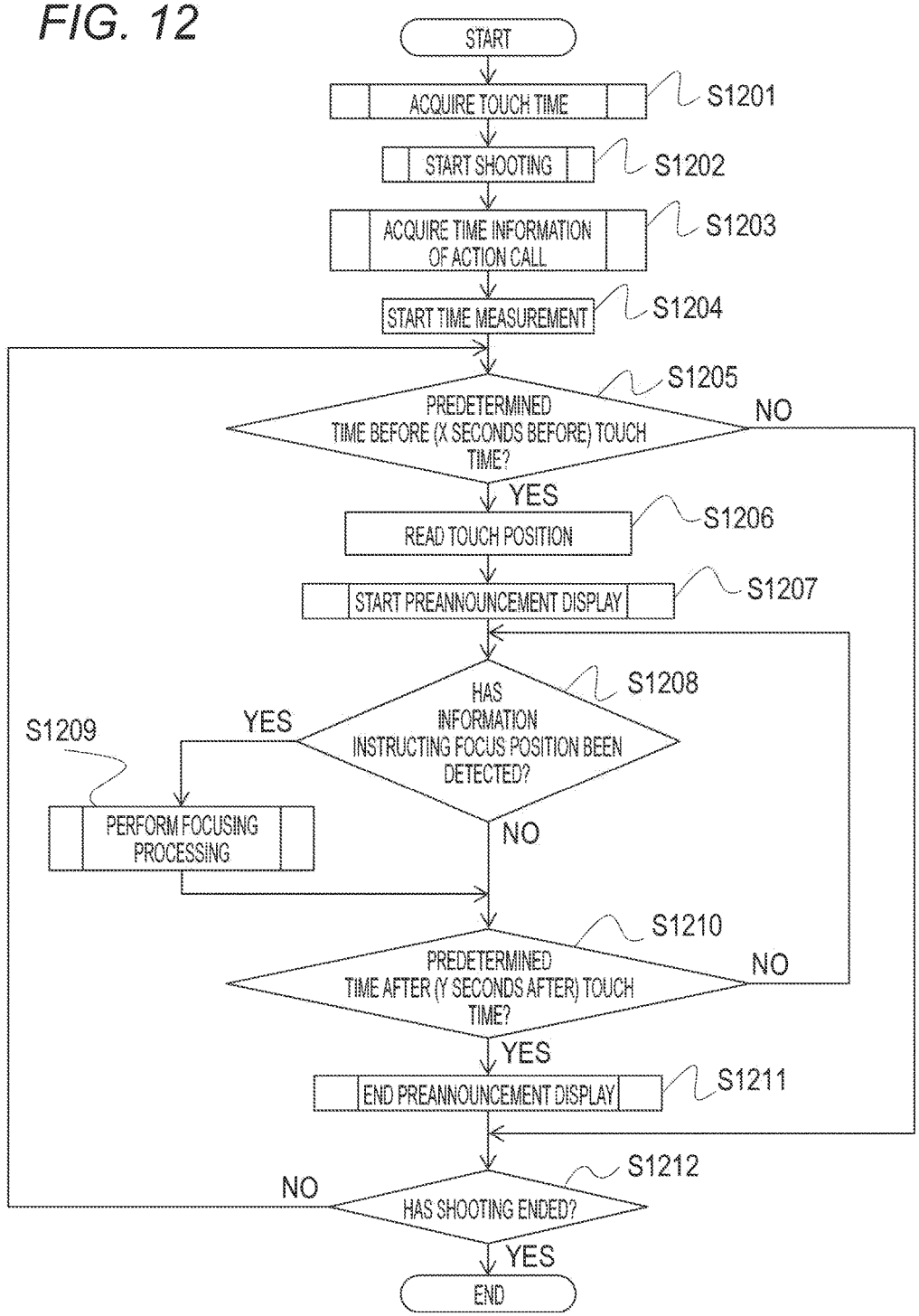
FIG. 12 is a flowchart illustrating focusing processing in real shooting according to the third exemplary embodiment.

Next, FIG. 12 is a flowchart illustrating the details of the focusing processing that is executed by the video processing apparatus 100 according to the present exemplary embodiment based on a stored focus position.

The processes in steps S1201 to S1204 in FIG. 12 are the same processes as the respective processes in S401 to S404 in FIG. 4 in the first exemplary embodiment. Thus, the description thereof will be omitted. In other words, in step S1201, the video processing apparatus 100 according to the present exemplary embodiment acquires a touch time stored in the storage unit 111, and in step S1204, the video processing apparatus 100 starts time measurement in response to the detection of an action call.

In step S1205, the video processing apparatus 100 determines whether a time measured by the time measurement unit 110 is a time a predetermined time before (X seconds before) the touch time acquired from the storage unit 111 in step S1201. In this step, if it is determined that a time measured by the time measurement unit 110 is a time a predetermined time before the touch time (YES in step S1205), the video processing apparatus 100 advances the processing to step S1206. On the other hand, if it is determined that a time measured by the time measurement unit 110 is not a time a predetermined time before the touch time (No in step S1205), the video processing apparatus 100 advances the processing to step S1212.

In step S1206, the video processing apparatus 100 acquires information indicating a touch position that is stored in the storage unit 111. More specifically, the coordinate acquisition unit 113 according to the present exemplary embodiment acquires (reads, calls) information indicating a touch position that is saved in the storage unit 111. In addition, the information indicating a touch position is information indicating a touch position that corresponds to information indicating a touch time that has been acquired in step S1201. In this example, the touch position (the position 606) stored in step S306 in FIG. 3 is acquired.

In step S1207, the video processing apparatus 100 starts preannouncement display of a touch position. More specifically, the video processing apparatus 100 displays preannouncement information at the touch position acquired in step S1201, and displays information indicating a remaining time before a touch time (count information). For example, when the video processing apparatus 100 of the present exemplary embodiment has acquired information indicating a touch position in step S1206, as illustrated in FIG. 13A, the video processing apparatus 100 displays a frame indicating preannouncement information, at the position 606 on the display screen 601 of the display unit 103 that corresponds to the information indicating a touch position. In addition, the video processing apparatus 100 displays the count information 1504 based on a touch time acquired from the storage unit 111 and a time acquired from the time measurement unit 110. In this example, the count information 1504 is information indicating a remaining time before a touch time (i.e., a time at which information instructing a focus position has been input in rehearsal shooting) in a countdown style.

In step S1208, the video processing apparatus 100 determines whether information instructing a focus position has been acquired (detected). If the display unit 103 receives, from the user, an operation. (e.g., touch operation) of instructing a new focus position, the input unit 106 according to the present exemplary embodiment acquires information instructing a focus position. If information instructing a focus position has been newly detected (touch operation has been detected) in step S1208 (YES in step S1208), the video processing apparatus 100 advances the processing to step S1209. On the other hand, if information instructing a focus position has not been newly detected (No in step S1208), the video processing apparatus 100 advances the processing to step S1210.

In step S1209, the video processing apparatus 100 performs focusing processing based on the information instructing a focus position that has been acquired in step S1208. More specifically, the input unit 106 according to the present exemplary embodiment outputs the information instructing a focus position, to the instruction unit 105. Then, based on the information instructing a focus position, the instruction unit 105 acquires information indicating a touch position, and outputs the acquired information to the focus control unit 107. Then, based on the information indicating a touch position, the focus control unit 107 performs processing for driving the lens 102 so that a focus is put on the touch position (focusing processing).

In addition, if information instructing a focus position has been acquired in step S1208 of the present exemplary embodiment, as illustrated in FIG. 13B, a cursor is displayed at the instructed position 1507 on the display screen 601 of the display unit 103. By referring to the cursor displayed at the position 606 corresponding to the touch position instructed in rehearsal shooting, the user can predict a position on which focusing processing for the actor B is to be performed. Furthermore, by referring to the displayed count information 1504, the user can predict a timing at which focusing processing is to be performed. In addition, after focusing processing has been performed in step S1209, as illustrated in FIG. 13C, a focus is put on the actor B existing at the position 1508. In addition, the count information 1504 is continuously displayed. The count information 1504 and the cursor corresponding to the touch position continue to be displayed until it is determined in step S1210 of the present exemplary embodiment that a predetermined time has elapsed from the touch time. Thus, the user can recognize an elapsed time. Then, even if a timing at which the actor B reaches the position 606 corresponding to the touch position is delayed, the user can predict a position on which focusing processing is to be performed.

In step S1210, the video processing apparatus 100 determines whether a time measured by the time measurement unit 110 indicates a predetermined time after (Y seconds after; X and Y may be the same or may be different) the touch time acquired from the storage unit 111 in step S1201. In this step, if it is determined that a time measured by the time measurement unit 110 indicates the predetermined time after the touch time (YES in step S1210), the video processing apparatus 100 advances the processing to step S1211. On the other hand, if it is determined that a time measured by the time measurement unit 110 does not indicate the predetermined time after the touch time (No in step S1210), the video processing apparatus 100 returns to the processing in step S1208.

In step S1211, the video processing apparatus 100 ends preannouncement display of a touch position. More specifically, the video processing apparatus 100 ends display of preannouncement information for the touch position acquired in step S1201, and information indicating a time that is based on the touch time (count information). After the processing in step S1211, the video processing apparatus 100 then advances the processing to step S1212.

In step S1212, the video processing apparatus 100 determines whether shooting has ended. If it is determined that shooting has ended (YES in step S1212), the video processing apparatus 100 ends the focusing processing that is based on a stored touch position. If it is determined that shooting has not ended (NO in step S1212), the video processing apparatus 100 returns to the processing in step S1205.

Through the processing in FIG. 12, the video processing apparatus 100 according to the present exemplary embodiment can put a focus on the actor B even if a stand position of the actor B in real shooting (the position 1508 in FIGS. 13B and 13C) differs from a position corresponding to information indicating a touch position (the position 606 in FIGS. 13A, 13B, and 13C). More specifically, as illustrated in FIGS. 13A, 13B, and 13C, in step S1207, preannouncement information (the cursor at the position 606 and the count information 1504) is displayed. Then, after checking the preannouncement information, the user performs an operation of instructing a new focus position. Through the processing, the video processing apparatus 100 according to the present exemplary embodiment performs focusing processing with respect to the newly instructed focus position. As a result, the video processing apparatus 100 can put a focus on the actor B.

Figure 15:
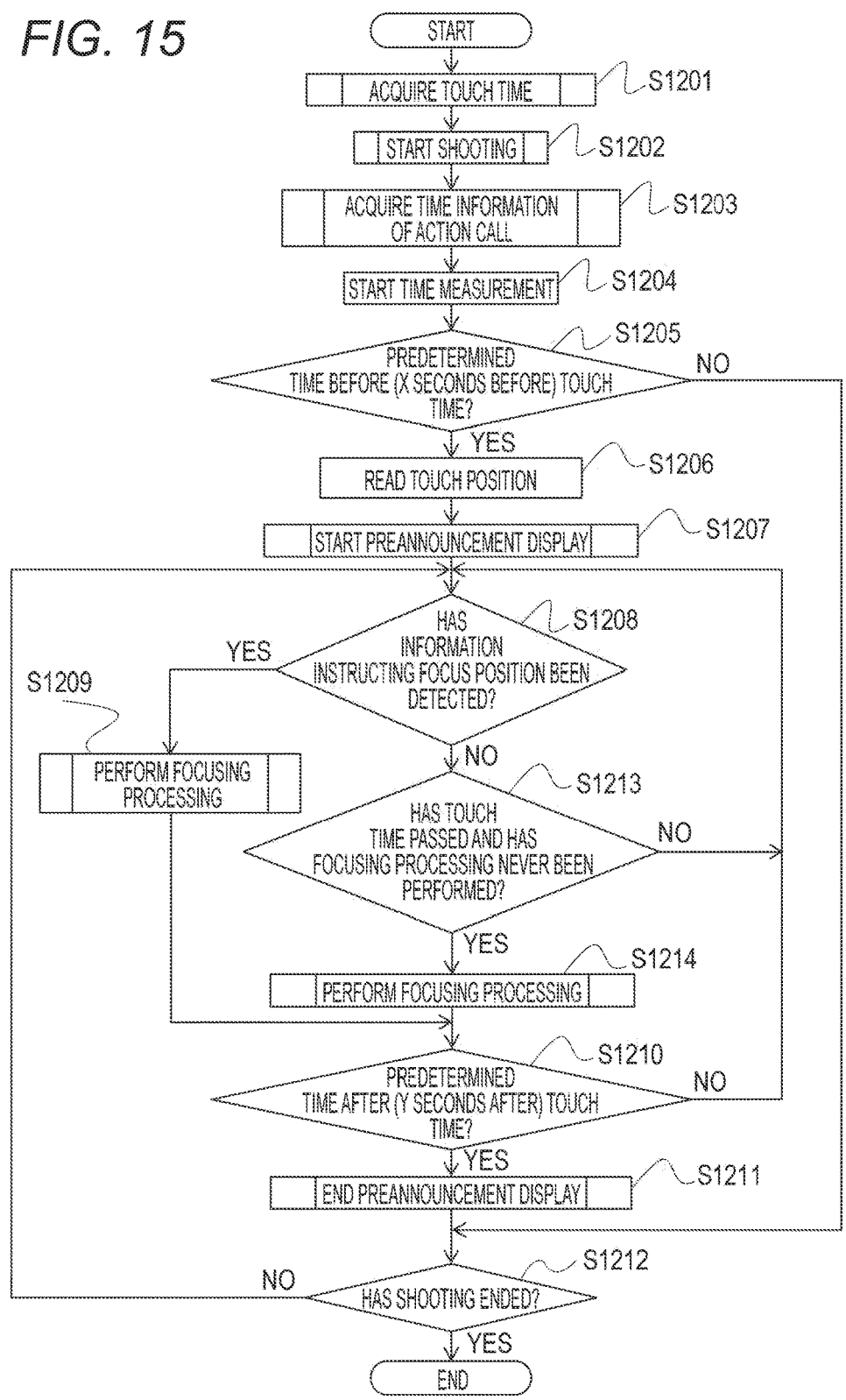
FIG. 15 is a flowchart illustrating another example of focusing processing in real shooting according to the third exemplary embodiment.

In addition, if the video processing apparatus 100 according to the present exemplary embodiment has not newly detected information instructing a focus position in step S1208 illustrated in FIG. 12 (No in step S1208), the video processing apparatus 100 advances the processing to step S1210. The configuration of the video processing apparatus 100, however, is not limited to this. For example, as illustrated in FIG. 15, if the video processing apparatus 100 has not newly detected information instructing a focus position (No in step S1208), the video processing apparatus 100 may advance the processing to the processing in step S1213. In step S1213, the video processing apparatus 100 determines whether the time acquired from the time measurement unit 110 indicates that the touch time acquired from the storage unit 111 has passed, and focusing processing has never been performed. Then, if it is determined in step S1213 that the touch time has passed, and focusing processing has never been performed (YES in step S1213), the video processing apparatus 100 advances the processing to step S1214. Then, in step S1214, the video processing apparatus 100 may perform focusing processing based on the touch position read (stored) in step S1206. In addition, if it is determined in step S1213 that the touch time has not passed, and/or focusing processing has ever been performed once or more (No in step S1213), the video processing apparatus 100 returns to the processing in step S1208. By performing the processes in steps S1213 to S1214 in FIG. 15 in this manner, the video processing apparatus 100 can perform focusing processing that is based on a stored touch position and a touch time, when the stored touch position matches a position of a subject, for example.

As described above, according to the video processing apparatus of the present exemplary embodiment, a focus can be put on a subject existing at a position different from a prestored focus position.

Furthermore, according to the video processing apparatus of the present exemplary embodiment, a prestored touch position and a touch time can be displayed. More specifically, the video processing apparatus of the present exemplary embodiment can display preannouncement information (cursor corresponding to a touch position and counter information that is based on a touch time) based on a stored touch position and a touch time. With this configuration, the video processing apparatus of the present exemplary embodiment can assist the user to perform an operation of instructing a new focus position, in performing shooting again (in real shooting). For example, even if a stand position and an operation timing of an actor serving as a subject differ from a touch position and a touch time, the user can easily instruct a focus position again by checking displayed preannouncement information.

In addition, the video processing apparatus of the present exemplary embodiment can appropriately perform focusing processing even without a measurement device used for measuring a distance in conventional focusing processing.

In addition, when a plurality of touch positions is stored, the video processing apparatus of the present exemplary embodiment can appropriately perform focusing processing by using a touch time, without receiving, from the user, an operation of selecting a touch position to be used, from among the plurality of touch positions.

In addition, the video processing apparatus according to the present exemplary embodiment is configured to display only preannouncement information in real take shooting. Nevertheless, the video processing apparatus may have a configuration obtained by combining the present exemplary embodiment with the above-described first exemplary embodiment and/or the second exemplary embodiment. With this configuration, if it is determined that focusing processing is to be performed with respect to a position corresponding to touch position and at a time corresponding to a touch time that are stored in rehearsal shooting, the video processing apparatus does not have to receive information instructing a new focus position. In other words, with this configuration, the video processing apparatus may perform focusing processing that is based on a stored touch position and a touch time, when the stored touch position matches a position of a subject, for example.

Fourth Exemplary Embodiment

Figure 14:
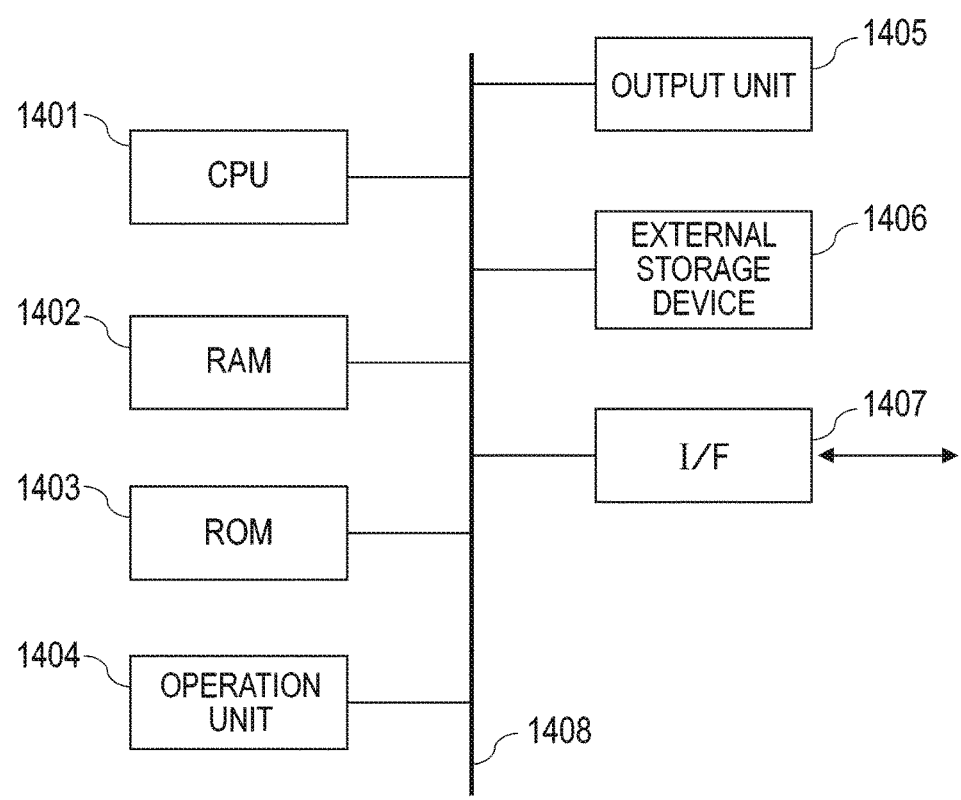
FIG. 14 is a block diagram illustrating a hardware configuration example of a computer applicable to a video processing apparatus.

In the above-described exemplary embodiments, the description has been given assuming that the units illustrated in FIGS. 1, 8, and 11 are formed by hardware components. Nevertheless, the processes illustrated in FIGS. 3, 4, 9, 12, and 15 that are performed by part or all of the units illustrated in FIGS. 1, 8, and 11 may be implemented by computer programs. The present exemplary embodiment will be described below using FIG. 14. FIG. 14 is a block diagram illustrating a hardware configuration example of a computer applicable to the video processing apparatus according to each of the above-described exemplary embodiments.

A central processing unit (CPU) 1401 controls the entire computer using computer programs and data stored in a random access memory (RAM) 1402 and a read-only memory (ROM) 1403, and executes each of the above-described processes in such a manner that the video processing apparatus according to each of the above-described exemplary embodiments performs the processes. In other words, the CPU 1401 functions as each processing unit illustrated in FIGS. 1, 8, and 11.

The RAM 1402 has an area for temporarily storing computer programs and data that have been loaded from an external storage device 1406, data acquired from the outside via an interface (I/F) 1407, and the like. Furthermore, the RAM 1402 has a work area to be used when the CPU 1401 executes various types of processing. In other words, the RAM 1402 can be allocated as, for example, an image memory (specific memory), or can appropriately provide other various areas.

The ROM 1403 stores setting data of this computer, boot programs, and the like. An operation unit 1404 includes a keyboard, a mouse, and the like. The operation unit 1404 can input various instructions to the CPU 1401 by being operated by the user of this computer. An output unit 1405 outputs a processing result obtained by the CPU 1401. In addition, the output unit 1405 is formed by, for example, a liquid crystal display, and displays a processing result obtained by the CPU 1401.

The external storage device 1406 is a large-capacity information storage device typified by a hard disc drive. An operating system (OS) and computer programs for causing the CPU 1401 to implement the functions of the units illustrated in FIG. 14 are saved in the external storage device 1406. Furthermore, each piece of image data to be processed may be saved in the external storage device 1406.

The computer programs and data that are saved in the external storage device 1406 are appropriately loaded into the RAM 1402 according to the control by the CPU 1401, to be processed by the CPU 1401. Networks such as a local area network (LAN) and the Internet, and other devices such as a projection device and a display device can be connected to the I/F 1407. This computer can acquire and transmit various types of information via the I/F 1407. A bus 1408 is a bus for connecting the above-described units.

In the operations having the above-described configuration, the CPU 1401 plays a central role in controlling the operations described with reference to the above-described flowcharts.

Other Exemplary Embodiments

In each of the above-described first to third exemplary embodiments, the units of the video processing apparatus are included in a single apparatus. The configuration of the video processing apparatus, however, is not limited to this. In other words, part of the units of the video processing apparatus may be included in another apparatus. For example, the display unit 103 and the input unit 106 of the video processing apparatus 100 may be included in another device (e.g., tablet device), and the other device and the video processing apparatus 100 may be connected in a wired or wireless manner. Alternatively, the lens 102 and the microphone 108 of the video processing apparatus 100 may be included in another apparatus (e.g., imaging apparatus), and the other apparatus and the video processing apparatus 100 may be connected in a wired or wireless manner.

In addition, in each of the above-described first to third exemplary embodiments, the video processing apparatus reads stored information indicating a touch position, and displays a cursor at a position on a display screen that corresponds to the touch position. In addition, in each of the above-described first to third exemplary embodiments, if there is a plurality of stored touch positions, the video processing apparatus may display cursors corresponding to the plurality of touch positions, using different methods. For example, in a video, when a focus position is first instructed, a first touch position and a first touch time are stored, and when a new focus position is instructed next (secondly), a second touch position and a second touch time are stored. In such a case, the video processing apparatus may display a cursor corresponding to the first touch position and a cursor corresponding to the second touch position, using different display modes (e.g., different colors).

According to the above-described various exemplary embodiments, in accordance with a focus position instructed in the first shooting and a timing at which the instruction has been received, a focus position can be controlled in the second shooting. In other words, position information and time information that are based on a focus position instructed in the first shooting are acquired, and a focus position can be controlled in the second shooting using these pieces of information. Consequently, in the second shooting, a focus position can be controlled while being adjusted in view of a shift from a position on which a focus has been put in the first shooting and a shift from a time at which the focus has been put. Thus, a focus can be easily put on a desired position at a desired timing.

The present invention can also be implemented by the following processing. More specifically, a program for implementing 1 or more functions of the above-described exemplary embodiments is supplied to a system or an apparatus via a network or a storage medium, and 1 or more processors in a computer of the system or the apparatus reads and executes the program. In addition, the present invention can also be implemented by a circuit for implementing 1 or more functions (e.g., application specific integrated circuits (ASIC)).

According to each of the above-described exemplary embodiments, in accordance with a focus position instructed in the first shooting and a timing at which the instruction has been received, a focus position can be controlled in the second shooting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-140045, filed Jul. 13, 2015, which is hereby incorporated by reference herein in its entirety.

What is claimed is:

1. A video processing apparatus comprising:
   an input unit configured to input, during a first video filming for filming a sequence of actions including a predetermined motion, information instructing a focus position, the focus position being a position on which a focus is to be put during a portion of the first video filming;
   an acquisition unit configured to acquire, in a case where the information instructing the focus position has been input by the input unit, position information indicating the instructed focus position, and time information indicating a first time at which the focus position has been instructed, the first time being measured relative to a start of the first video filming; and
   a control unit configured to control a focus position during a portion of a second video filming, the second video filming for filming the sequence of actions including the predetermined motion again, and the control performed based on the position information and the time information that have been acquired by the acquisition unit, wherein the control unit performs the focus control at a second time, the second time being measured relative to a start of the second video filming,
   wherein the second time corresponds to the first time.

2. The video processing apparatus according to claim 1, further comprising:
   a detection unit configured to detect predetermined identification information indicating a start of a video filming; and
   a measurement unit configured to measure an elapsed time from a time point at which the predetermined identification information has been detected by the detection unit,
   wherein the control unit performs control so as to put a focus on a position that is based on the position information acquired by the acquisition unit, according to the time measured by the measurement unit and the time information acquired by the acquisition unit.

3. The video processing apparatus according to claim 2, further comprising a second detection unit configured to detect an object,
   wherein the second detection unit detects an object existing in a region that is based on the position information acquired by the acquisition unit, according to the time measured by the measurement unit and the time information acquired by the acquisition unit, and wherein the control unit performs control so as to put a focus on a position that is based on a detection result obtained by the second detection unit.

4. The video processing apparatus according to claim 3, wherein the second detection unit detects an object existing in a region within a predetermined distance from a position that is based on the position information acquired by the acquisition unit, according to the time measured by the measurement unit and the time information acquired by the acquisition unit, and wherein the control unit performs control so as to put a focus on a position of the object detected by the second detection unit.

5. The video processing apparatus according to claim 1, further comprising a storage unit configured to store the position information and the time information that have been acquired by the acquisition unit, in association with each other, wherein the control unit adjusts a focus based on the position information and the time information that are stored in the storage unit.

6. The video processing apparatus according to claim 1, further comprising:
a second acquisition unit configured to acquire a video acquired by the second video filming; and
a detection unit configured to detect predetermined identification information;
a measurement unit configured to measure an elapsed time from a time point at which the predetermined identification information has been detected by the detection unit; and
a display control unit configured to perform control so as to display a graphic corresponding to the position information acquired by the acquisition unit, with the graphic being superimposed on the video acquired by the second acquisition unit, based on the time measured by the measurement unit and the time information acquired by the acquisition unit.

7. The video processing apparatus according to claim 6, wherein the display control unit performs control so as to display information indicating a difference between the time measured by the measurement unit and the time information acquired by the acquisition unit, and the graphic, the difference information and the graphic being superimposed on the video acquired by the second acquisition unit.

8. The video processing apparatus according to claim 6, wherein the display control unit performs control so as to display the graphic at a position corresponding to the position information.

9. A video processing method comprising:
an input step of inputting, during a first video filming for filming a sequence of actions including a predetermined motion, information instructing a focus position, the focus position being a position on which a focus is to be put during a portion of the first video filming;
an acquisition step of, in a case where the information instructing the focus position has been input by the input step, acquiring position information indicating the instructed focus position, and time information indicating a first time at which the focus position has been instructed, the first time being measured relative to a start of the first video filming; and
a control step of controlling a focus position during a portion of a second video filming, the second video filming for filming the sequence of actions including the predetermined motion again, and the controlling performed based on the position information and the time information that have been acquired by the acquisition step, wherein the control step performs the focus control at a second time, the second time being measured relative to a start of the second video filming,
wherein the second time corresponds to the first time.

10. A computer-readable non-transitory recording medium storing a program for causing a computer to function as:
an input unit configured to input, during a first video filming for filming a sequence of actions including a predetermined motion, information instructing a focus position, the focus position being a position on which a focus is to be put during a portion of the first, video filming;
an acquisition unit configured to acquire, in a case where the information instructing the focus position has been input by the input unit, position information indicating the instructed focus position, and time information indicating a first time at which the focus position has been instructed, the first time being measured relative to a start of the first video filming; and
a control unit configured to control a focus position during a portion of a second video filming, the second video filming for filming the sequence of actions including the predetermined motion again, and the control performed based on the position information and the time information that have been acquired by the acquisition unit, wherein the control unit performs the focus control at a second time, the second time being measured relative to a start of the second video filming,
wherein the second time corresponds to the first time.

* * * * *